Inventors:
Kenneth M. Armantrout
and Donald W. Kelbel
By: Ray E. Snyder Atty.

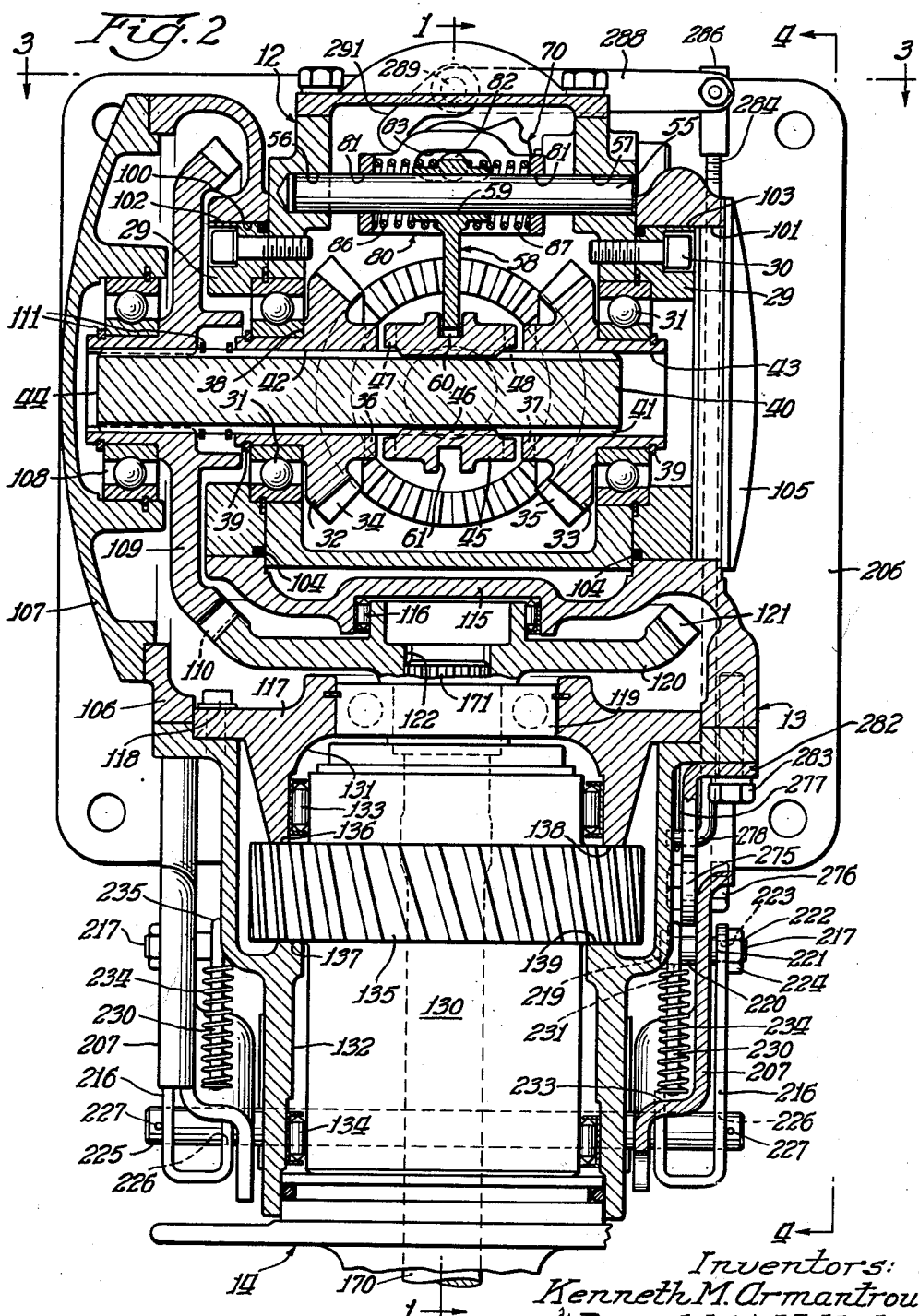

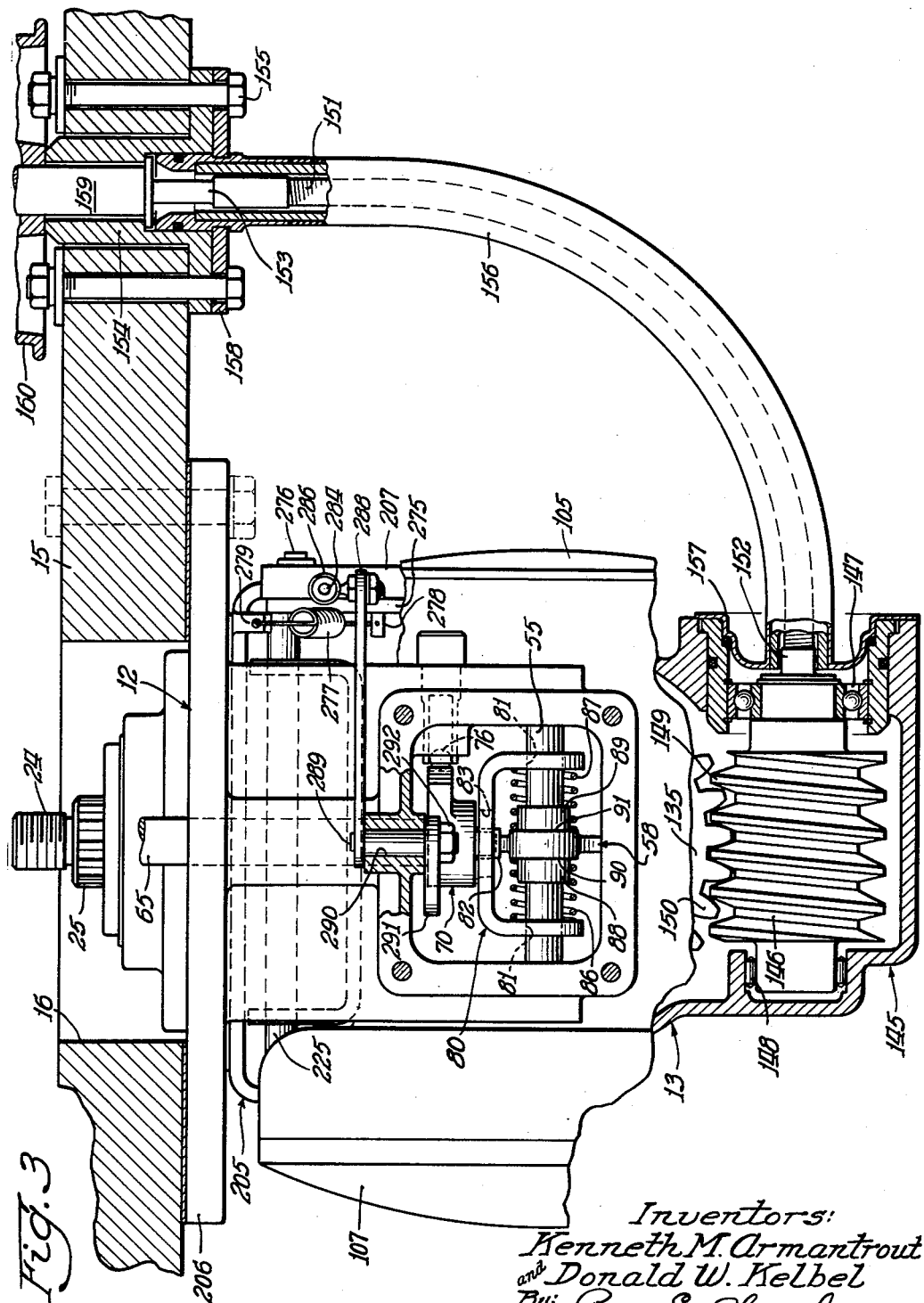

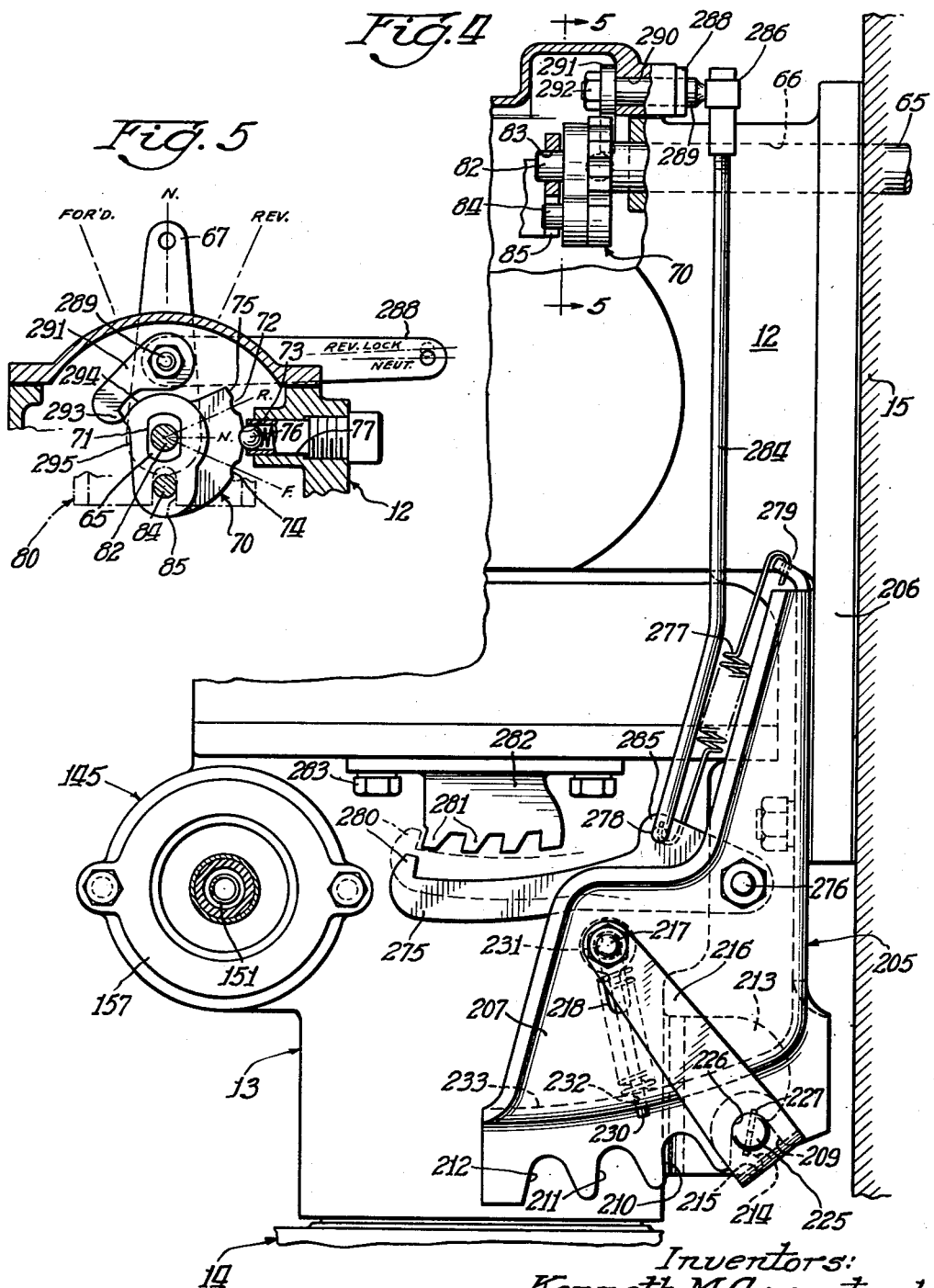

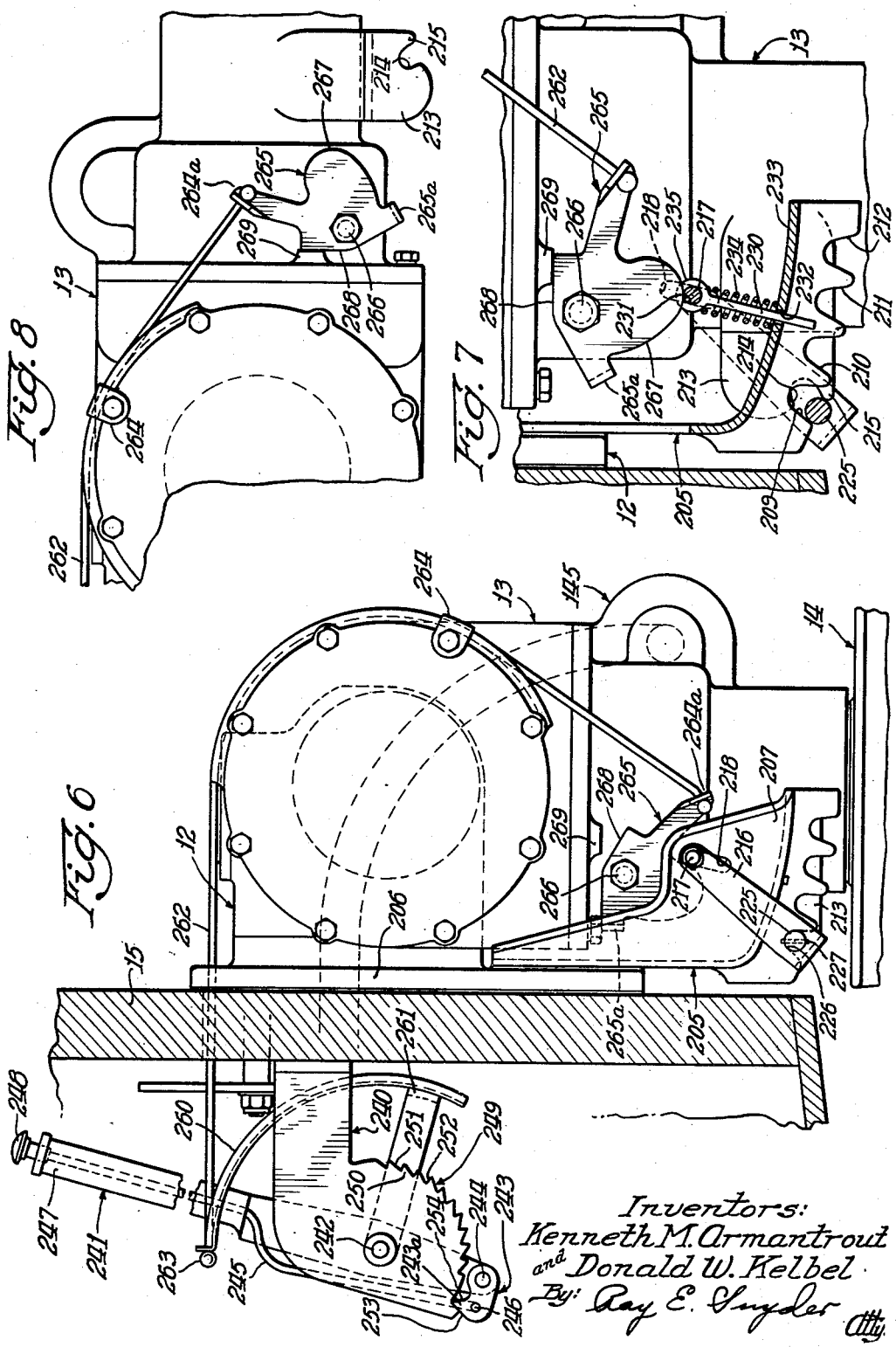

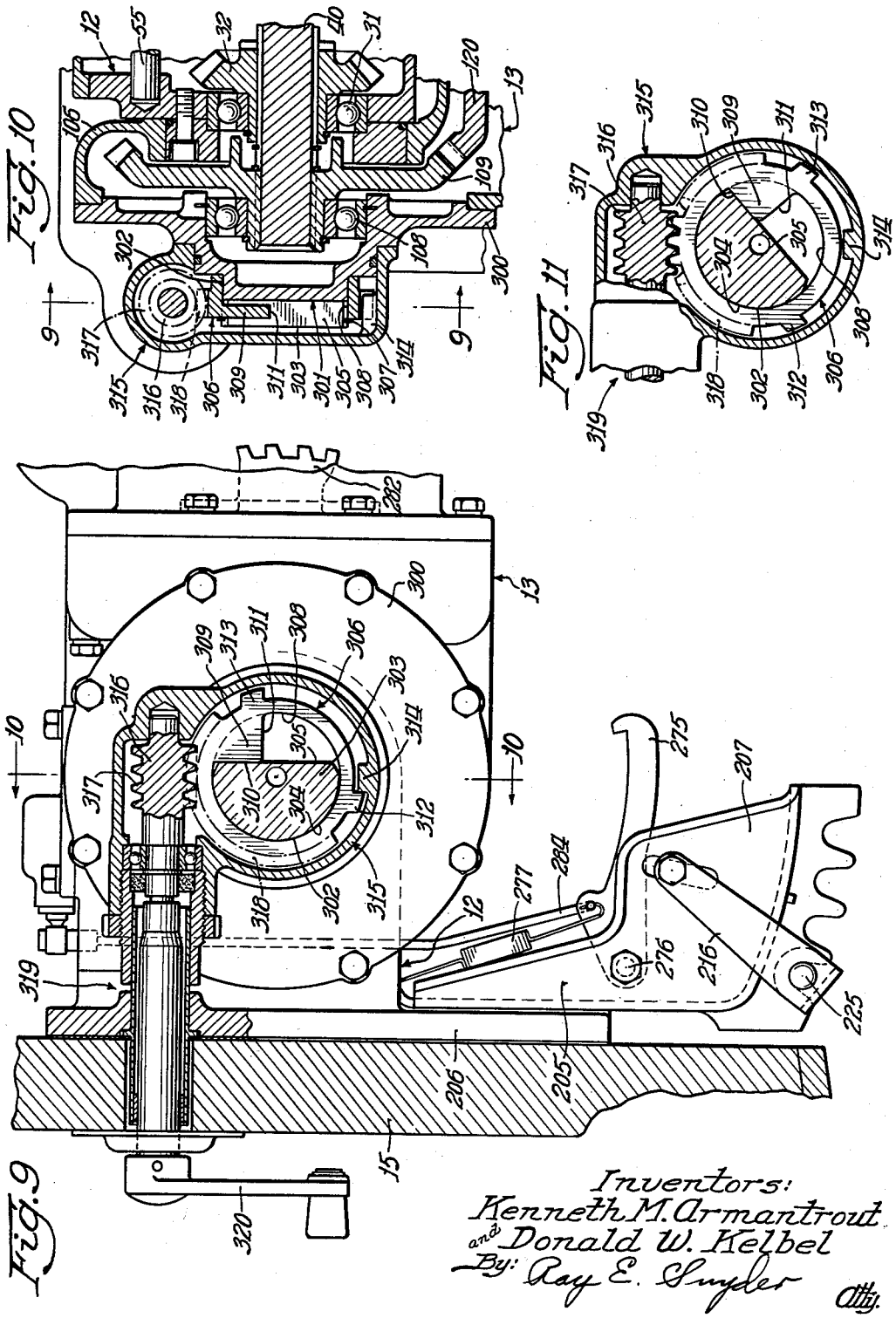

Inventors:
Kenneth M. Armantrout
and Donald W. Kelbel
By: Ray E. Snyder
Atty.

Jan. 19, 1965   K. M. ARMANTROUT ETAL   3,166,040
DRIVE UNIT FOR BOATS
Filed Nov. 21, 1960   14 Sheets-Sheet 8
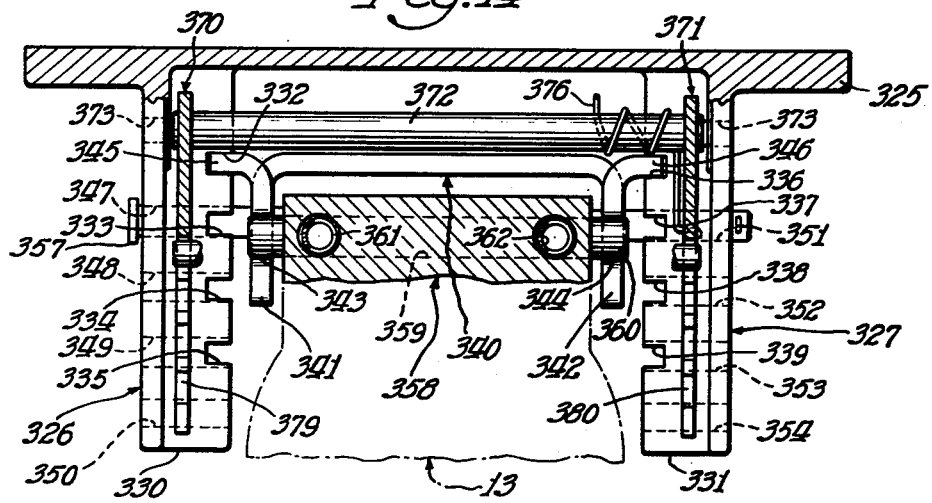
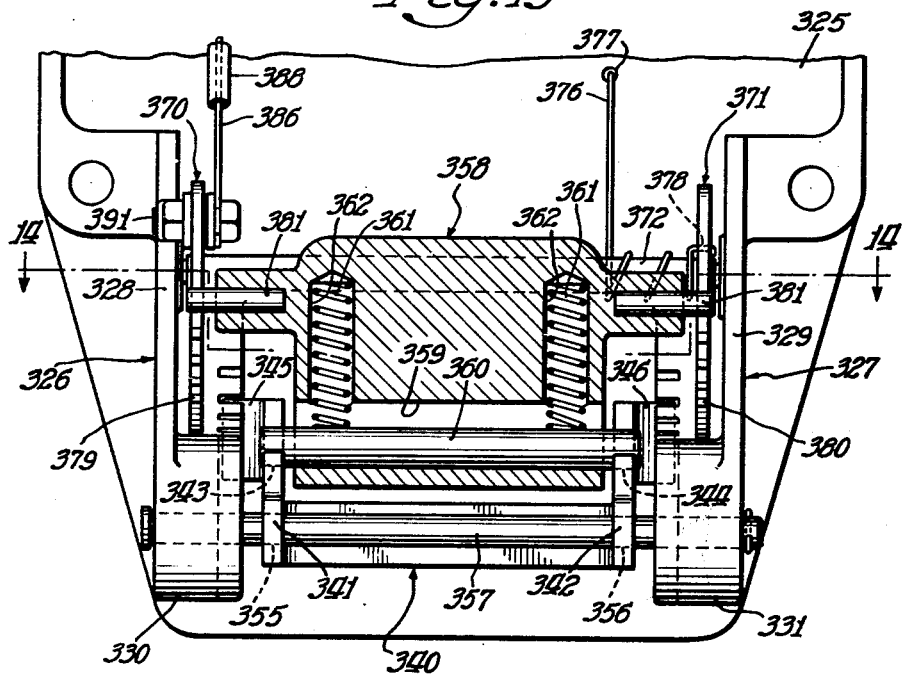
Inventors.
Kenneth M. Armantrout
and Donald W. Kelbel
By: Ray E. Snyder   Atty.

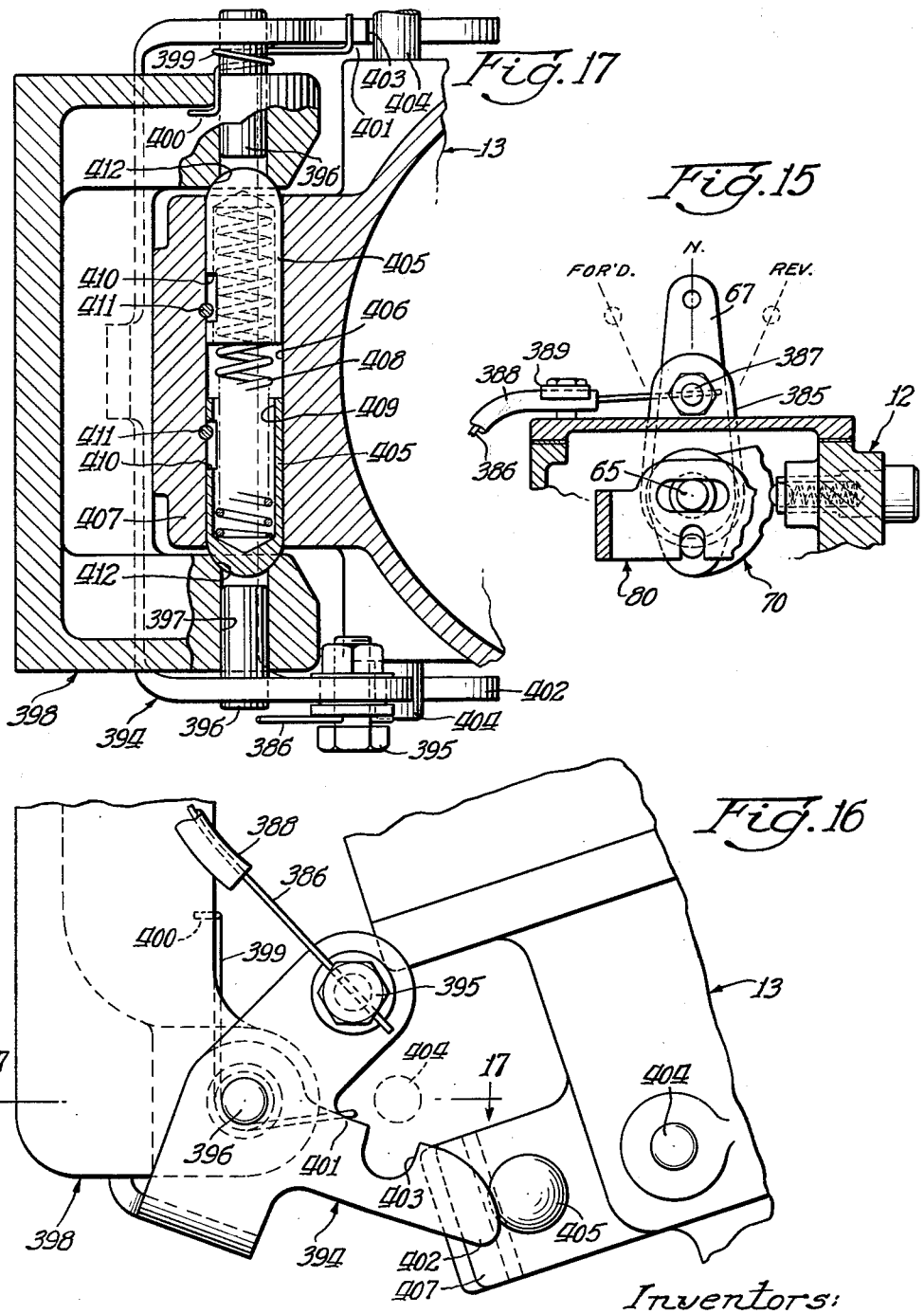

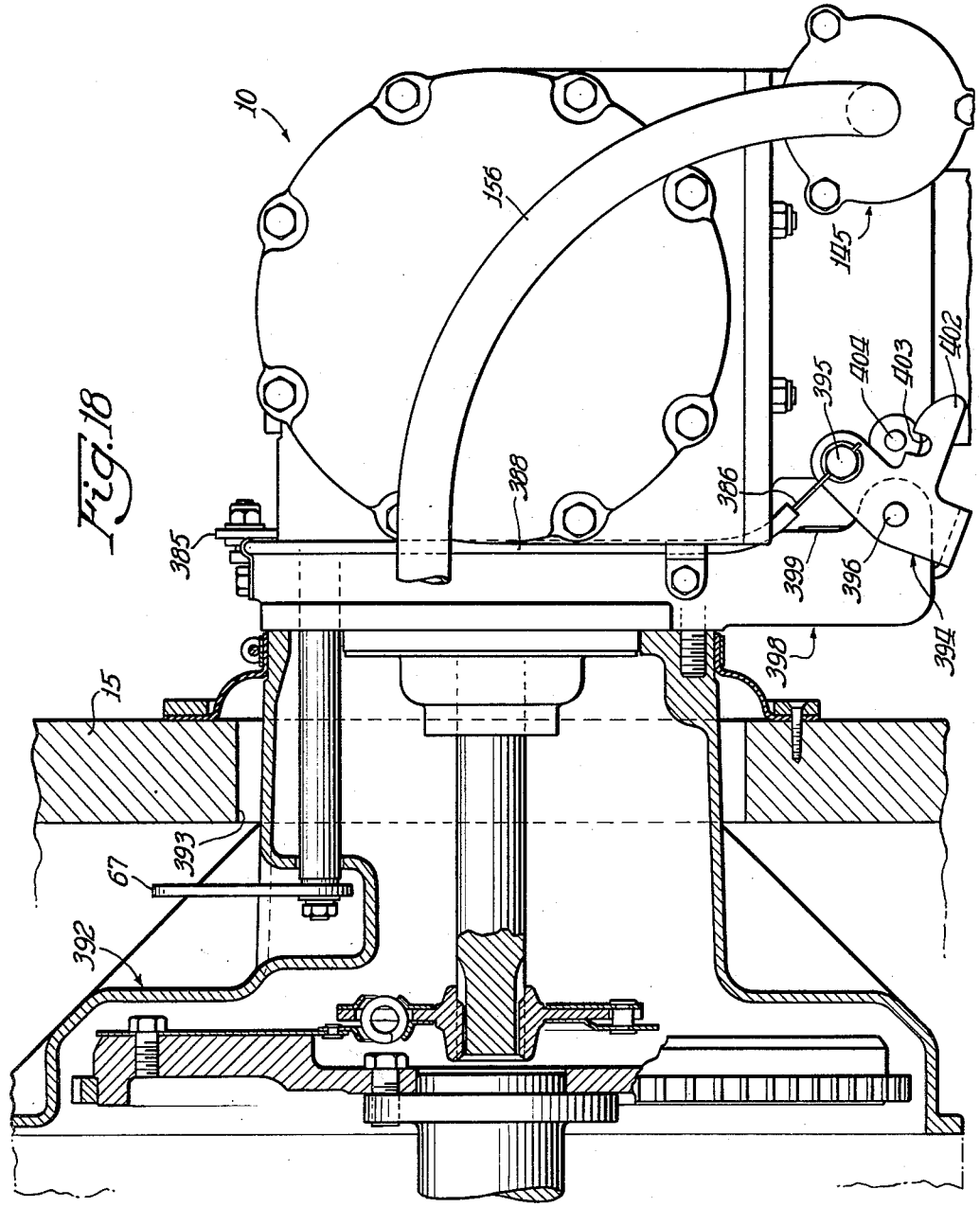

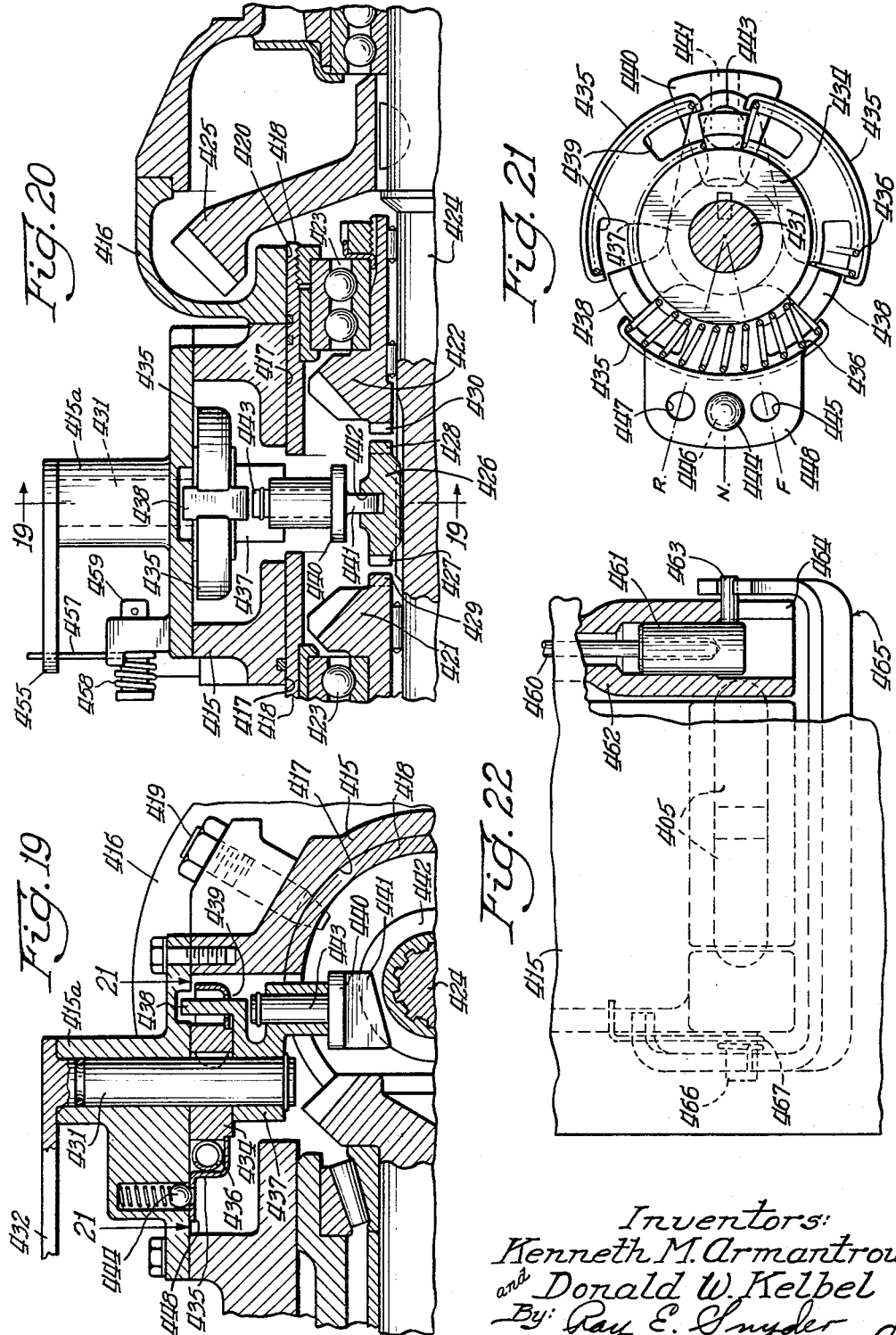

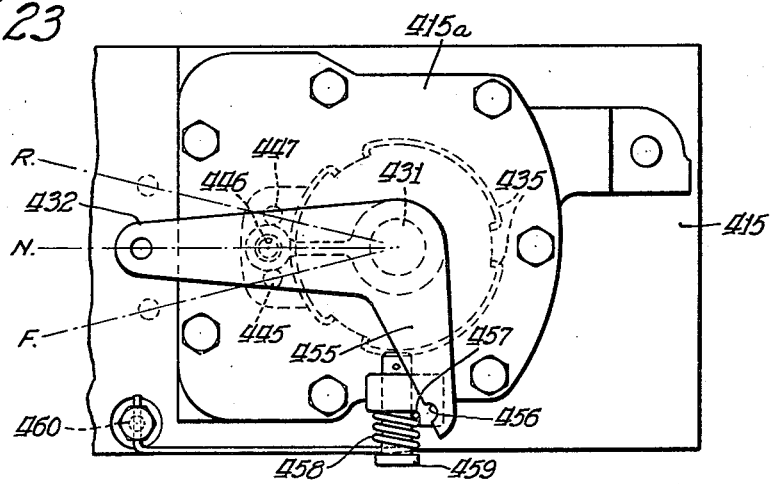
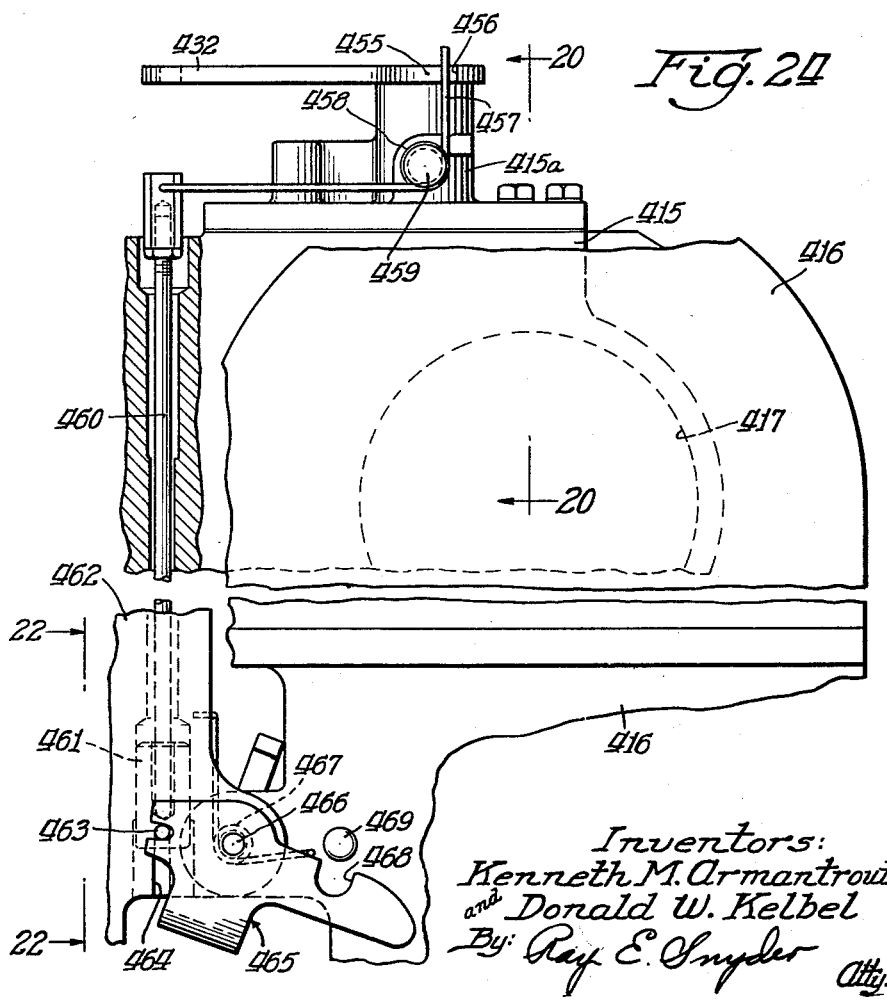

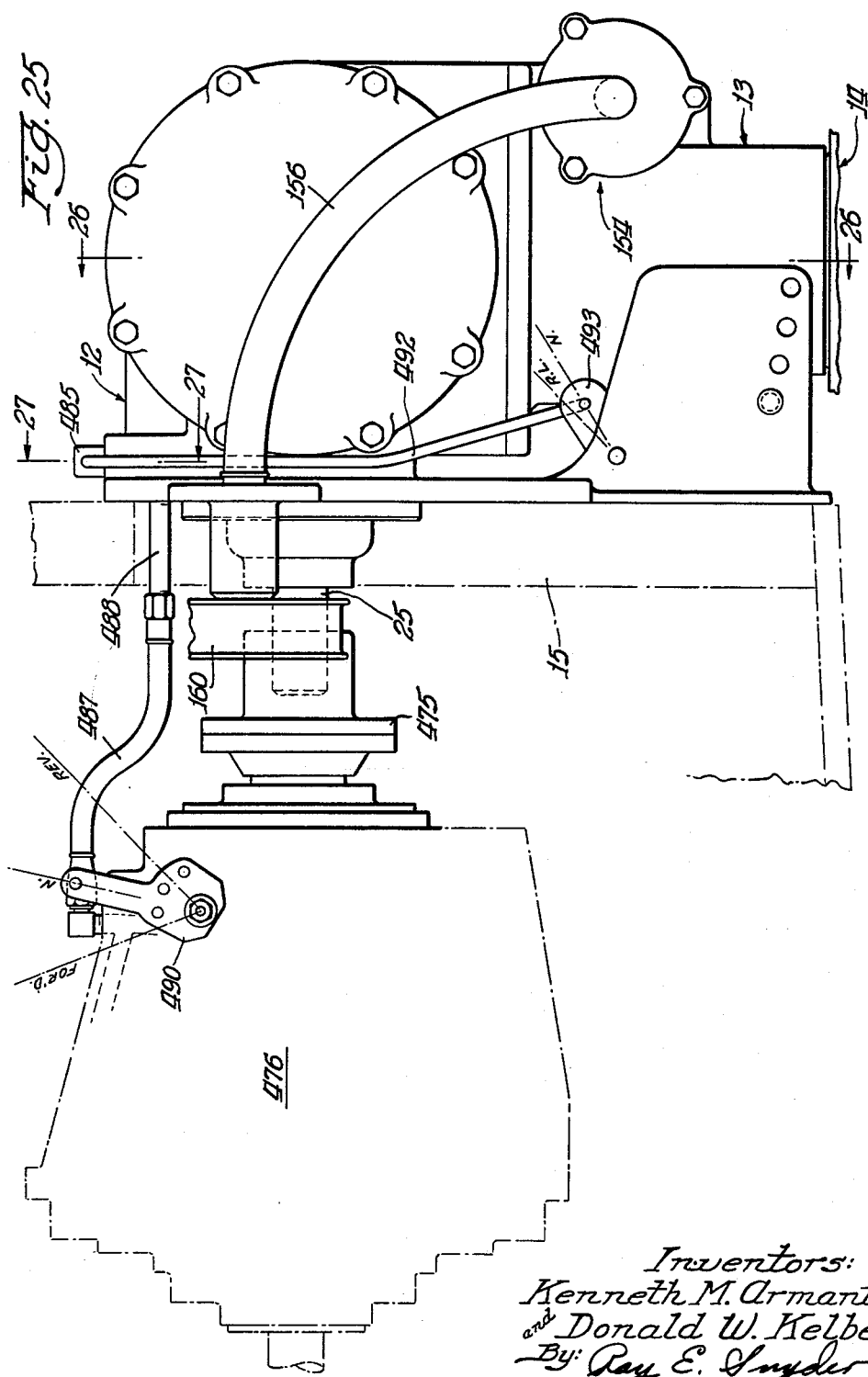

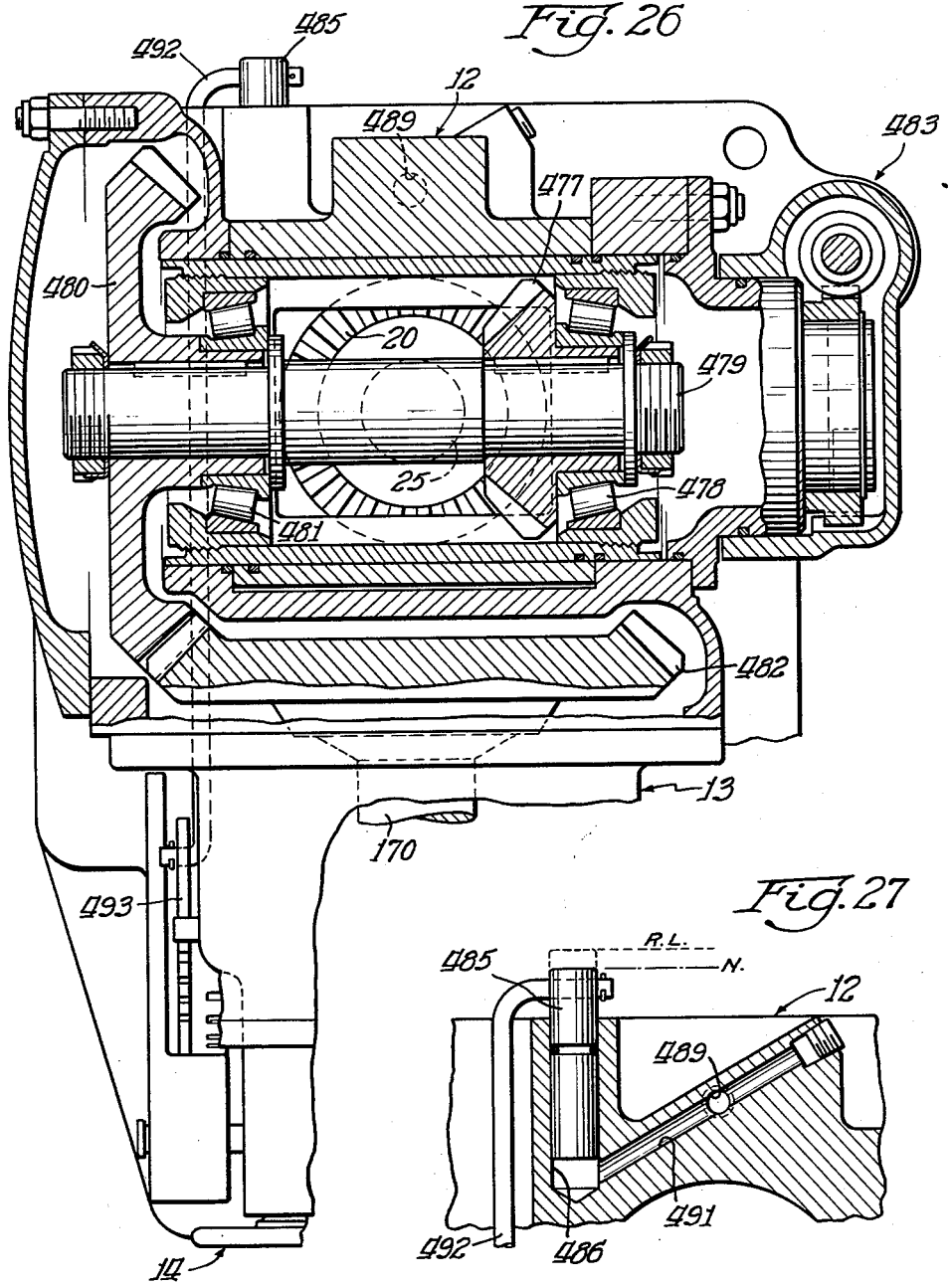

United States Patent Office 3,166,040
Patented Jan. 19, 1965

3,166,040
DRIVE UNIT FOR BOATS
Kenneth M. Armantrout and Donald W. Kelbel, Muncie, Ind., assignors to Borg-Warner Corporation, Chicago, Ill., a corporation of Illinois
Filed Nov. 21, 1960, Ser. No. 70,616
17 Claims. (Cl. 115—41)

This invention relates to a drive unit for boats and more particularly, to a stern drive unit mounted on the exterior of a boat and driven by an inboard engine.

In the propulsion of boats, a drive unit is utilized which usually comprises either a 2-cycle outboard motor and propeller unit mounted on the transom of the boat or a 4-cycle inboard engine with a propeller shaft through the bottom of the boat. Although the outboard method is advantageous to the extent that it is more portable, will kick-up upon striking an obstruction, has an adjustable thrust line, and has a direct steering effect; it has numerous disadvantages. In particular, it usually has somewhat limited steering angle, sizable inerta which resists kick-up, lower engine efficiency, poor weight distribution and considerable transom strain. Although the usual 4-cycle inboard engine is advantageous to the extent that it provides better efficiency than the 2-cycle outboard motor, more desirable weight distribution and no transom strain; it is nevertheless disadvantageous in that it has even more limited steering characteristics, no kick-up upon striking an obstruction, a forward inclined engine mounting and a fixed thrust line.

Both the outboard and the inboard types of boat propulsion individually present unavoidable inherent advantages and disadvantages which effect efficiency and safety in a manner characterized by the specific type of drive represented thereby. It is therefore extremely important to be able to propel a boat in a manner which simultaneously provides the advantages of both the inboard and outboard types of propulsion while minimizing the disadvantages of each.

It is a primary object of this invention to provide an improved outboard marine stern drive unit adapted to be driven by an inboard engine for propelling a boat in a highly versatile controllable, efficient and safe manner.

Another object of this invention is to provide an outboard marine drive unit driven by an inboard engine, having a propeller thrust line which is angularly adjustable in a vertical plane and which permits unlimited propulsion and steering in any position.

Still another object of this invention is to provide a marine stern drive unit driven by an inboard engine, having low inertia kick-up operative upon striking an obstruction which does not interrupt the power transmitted therethrough.

Another object of this invention is to provide a marine stern drive unit driven by an inboard engine, having an adjustable positioning index mechanism which releasably holds the unit in a selected down position and allows the unit to kick-up and return directly to the selected releasably held position.

A further object of this invention is to provide a marine stern drive unit driven by an inboard engine, having a kick-up which is automatically locked against movement by shifting the unit into reverse.

Another object of this invention is to provide a marine stern drive unit driven by an inboard engine having a depth adjustment which allows propulsion, steering and kick-up in any water depth.

A further object of this invention is to provide an outboard marine drive unit which can be driven by a horizontally mounted forward inboard engine, which does not require utilization of a universal joint or offset mounting of the propeller drive train.

An additional object of this invention is to provide an outboard marine drive unit having all of the above objects and providing a gear reduction drive train having all drive shafts thereof intersecting a single axis which is angularly adjustable in a vertical plane.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIG. 2 is a partial sectional view taken along line 2—2 of FIG. 1 showing forward and reverse elements of the outboard unit and a reverse lock linkage therefor;

FIG. 3 is a partial sectional view taken along line 3—3 of FIG. 2 showing a steering mechanism and shifting linkage for the drive unit;

FIG. 4 is a partial sectional view taken along line 4—4 of FIG. 2 showing the shifting linkage with the interconnected reverse lock mechanism and an adjustable kick-up mechanism;

FIG. 5 is a partial sectional view taken along line 5—5 of FIG. 4 showing the reverse lock linkage and positioning detent therefor;

FIG. 6 is a side view of the drive unit showing a ratchet raising means and a releasable adjustable lock interconnected therewith;

FIG. 7 is a partial side view of the drive unit illustrating the inter-relationship between the adjustable releasable locking means;

FIG. 8 is a partial side view of the drive unit in the raised position;

FIG. 9 is a partial sectional view taken along line 9—9 of FIG. 10 with the drive unit in raised position illustrating a worm gear raising mechanism therefor;

FIG. 10 is a partial sectional view taken along line 10—10 of FIG. 9 showing the relationship between the worm gear raising mechanism and the drive unit casing;

FIG. 11 is a partial sectional view of the worm gear raising mechanism showing the mechanism with the drive unit in an intermediate raised position;

FIG. 13 is a partial sectional view taken along line 13—13 of FIG. 12 showing a rear view of the reverse lock and break-away mechanism;

FIG. 14 is a partial sectional view taken along line 14—14 of FIG. 13 showing the top of the reverse lock and break-away mechanism;

FIG. 15 is a partial sectional view taken along line 15—15 of FIG. 12 showing a detent for positioning the shift linkage;

FIG. 16 is a partial side view of a modified reverse lock in its released position;

FIG. 17 is a partial sectional view taken along line 17—17 of FIG. 16 showing the modified reverse lock and break-away detent;

FIG. 18 is a partially sectioned side view of a modified version of the drive unit showing the unit mounted directly on the engine through the transom;

FIG. 19 is a partial sectional view taken along line 19—19 of FIG. 20 showing a modified shift linkage;

FIG. 20 is a partial sectional view taken along line 20—20 of FIG. 24 showing the modified shift linkage in neutral position;

FIG. 21 is a partially sectioned view taken along line 21—21 of FIG. 19 showing a spring-biased lost motion device utilized in the modified shift linkage;

FIG. 22 is a partially sectioned view taken along line 22—22 of FIG. 24;

FIG. 23 is a partial top view of the stern drive showing the external elements of the modified shift linkage;

FIG. 24 is a partial side view of the stern drive showing a modified reverse lock mechanism thereof;

FIG. 25 is a side view of a modified drive unit showing the unit coupled with a transmission and illustrating a hydraulic reverse lock;

FIG. 26 is a partial sectional view taken along line 26—26 of FIG. 25 showing a non-shiftable drive train for the unit;

FIG. 27 is a partial sectional view taken along line 27—27 of FIG. 25 showing a hydraulic reverse lock actuating piston.

Figure 1:
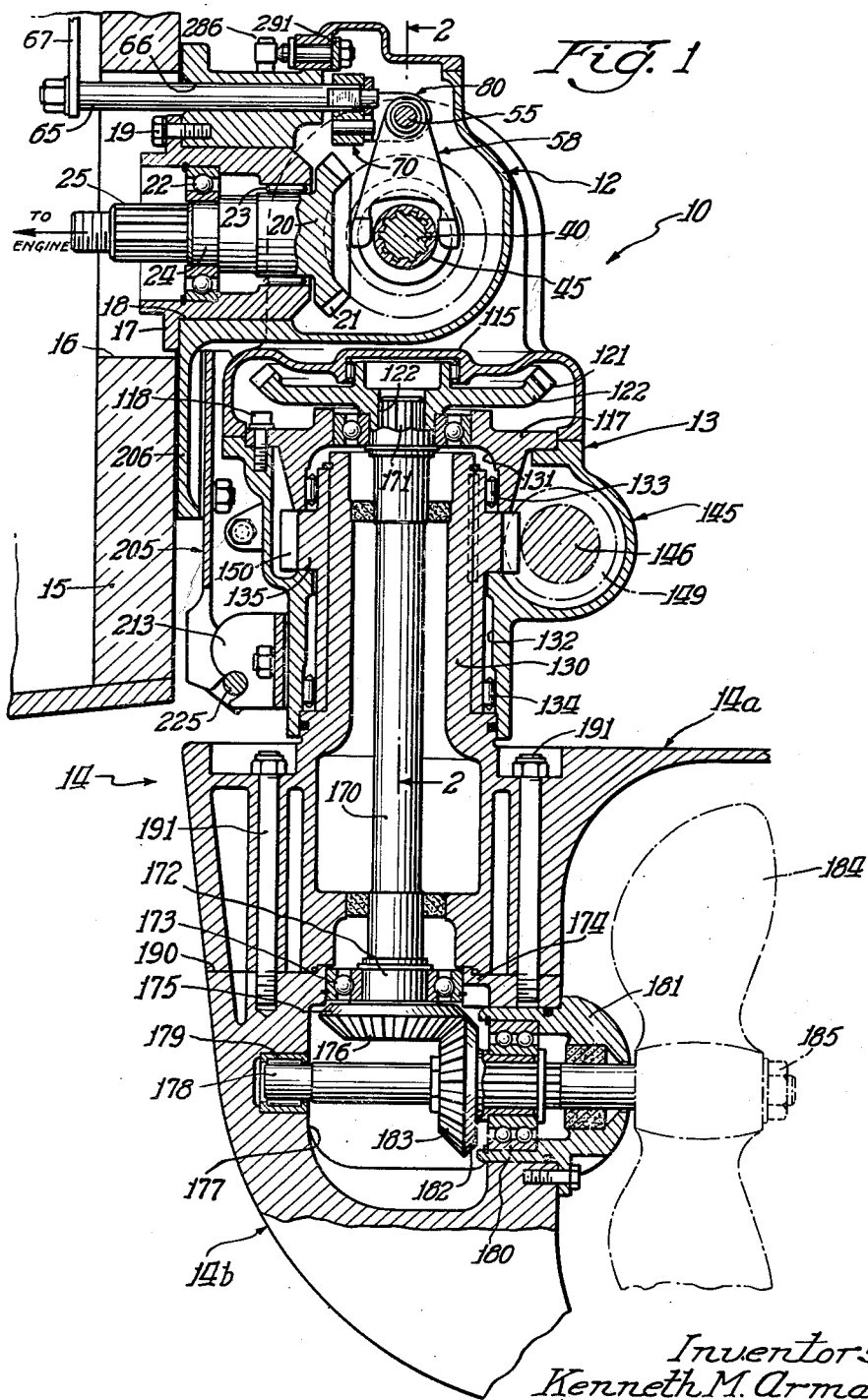
FIG. 1 is a sectional view taken along line 1—1 of FIG. 2 showing a shiftable outboard marine drive unit and the inter-relationship of body casings thereof.

Referring to the drawings there is illustrated (FIGS. 1–5) an exemplary embodiment of applicant's outboard marine drive unit, generally designated by the numeral 10, which is driven by an inboard engine (not shown). The unit comprises three casings, namely a head casing 12, an intermediate casing 13 and a propeller casing 14. The head casing 12 is rigidly mounted to a boat transom 15 adjacent an opening 16 in the transom. A bearing retainer 17 is rigidly mounted in an opening 18 in the head casing 12 by bolts 19 and extends into the opening 16 in the transom. A driving bevel gear 20 having a set of teeth 21 is rotatably supported in the bearing retainer 17 by bearings 22 and 23. The driving bevel gear 20 has a drive shaft 24 extending therefrom beyond the bearing 22 and into the opening 16 in the transom. The drive shaft 24 has a splined end portion 25 which provides a means for coupling the drive shaft 24 with the inboard engine.

A pair of bearing retainers 29 (FIG. 2) are rigidly mounted on opposite sides of the head casing 12 by a set of bolts 30. The retainers 29 retain a pair of aligned ball bearings 31 in the head casing 12. A reverse drive bevel gear 32 is rotatably supported in the left side of the head casing 12 (FIG. 2) by the ball bearing 31. A forward drive bevel gear 33 is similarly rotatably supported in the right side of the head casing 12 by the other ball bearing 31. The reverse drive bevel gear 32 has a set of drive teeth 34 in continuous driving engagement with the drive teeth 21 of the driving bevel gear 20. The forward drive bevel gear 33 has a similar set of drive teeth 35 which are also in continuous driving engagement with the teeth 21 of the driving bevel gear 20. It should be noted that the reverse and forward drive bevel gears 32 and 33 are aligned and in continuous driving engagement with the drive bevel gear 20 on opposite sides thereof. A reverse and forward drive are thereby provided on a single axis common to both.

The reverse and forward drive bevel gears 32 and 33 are provided with clutch teeth 36 and 37 on the respective facing inner radial surfaces thereof. Both the reverse drive bevel gears 32 and the forward drive bevel gear 33 have a shoulder 38 (FIG. 2) in engagement with the respective roller bearings 31 to prevent outward movement of the reverse and forward bevel gears 32 and 33. A retainer ring 39 is provided on both the reverse and forward drive bevel gears 32 and 33 immediately adjacent the respective roller bearings 31 to prevent inward axial movement of the reverse and forward bevel gears 32 and 33.

An idler shaft 40 having a splined peripheral surface 41 is concentrically rotatably mounted in a pair of axially aligned cylindrical openings 42 and 43 in the reverse and forward drive bevel gears 32 and 33 respectively. The shaft 40 has an end portion 44 extending to the left (FIG. 2) beyond the reverse drive bevel gear 32 and the head casing 12.

In order to select either the forward or reverse drive from the reverse or forward bevel gears 32 and 33 and apply it to the shaft 40, a shift collar 45 is provided. The shift collar 45 is splined to the shaft 40 by an internal spline 46 and is thereby drivingly connected to the shaft 40 and adapted to move axially thereon. The shift collar 45 has a set of reverse clutch teeth 47 which are engageable with the clutch teeth 36 of the reverse drive bevel gear 32 when the shift collar 45 is moved to the left (FIG. 2). Similarly, the shift collar 45 has a set of forward clutch teeth 48 which are drivingly engageable with the clutch teeth 37 of the forward drive bevel gear 33 when the shift collar 45 is moved to the right (FIG. 2).

Thus, a forward drive will be completed from the driving bevel gear 20 to the shaft 40 through the forward drive bevel gear 33 and the shift collar 45 when the shift collar 45 is moved to the right so that the clutch teeth 48 thereof are in engagement with the clutch teeth 38 of the forward drive bevel gear 33. Similarly, a reverse drive will be completed between the driving bevel gear 20 and the shaft 40 through the reverse drive bevel gear 32 and the shift collar 45 when the shift collar 45 is moved to the left so that the clutch teeth 47 thereof are in engagement with the clutch teeth 37 of the reverse drive bevel gear 32. Also it should be noted that a neutral condition is obtained by centering the shift collar between the reverse drive bevel gear 32 and the forward drive bevel gear 33 as shown in FIG. 2. In this position the reverse and forward drive bevel gears 32 and 33 will rotate in response to the drive bevel gear 20, but no power will be transmitted to the floating shaft 40 through the shift collar 45. The clutch teeth of the shift collar will not be in engagement with either set of clutch teeth 36 or 37 of the reverse drive bevel gear 32 or the forward drive bevel gear 23.

A shift linkage mechanism is provided (FIGS. 1–5) for the purpose of shifting the collar 45 on the shaft 40 to derive the desired drive or neutral condition. This linkage provides, among other things, a guide shaft 55 supported in the head casing 12 in openings 56 and 57 parallel to the shaft 40. A shift fork 58 is slidably mounted on the shaft 55 through a cylindrical internal passage 59 and has a pair of prongs 60 extending slidably into an annular groove 61 in the shift collar 45. Thus, axial movement of the shift fork 58 on the shaft 55 will cause the prongs 60 to move the shift collar 45 on the shaft 40. This movement is designed to result in engagement or disengagement of the clutch teeth 47 or 48 of the shift collar 45 with the clutch teeth 37 or 38 of the reverse or forward drive bevel gears 34 or 33 respectively.

A manual shifting means is provided as part of the shift mechanism (FIGS. 1–5) and is adapted for selectively moving the shift fork 58 on the shaft 55. The manual shifting means includes a torque shaft 65 rotatably mounted in a cylindrical passage 66 of the head casing 12 (FIGS. 1, 3 and 5). A shift lever 67 is rigidly secured to the torque shaft 65 and extends laterally therefrom inside the boat adjacent the transom 15 (FIG. 1). A radially extending cam 70 is keyed to the inner end of the torque shaft 65 by means of a flattened surface 71 on the torque shaft 65 adjacent the inside of the head casing 12. As the shift lever 67 is rotated clockwise about the axis of the torque shaft 65 from forward position to reverse position (FIG. 5) the cam 70 will consequently be moved likewise.

The cam 70 has a series of notches 72, 73 and 74 in the peripheral surface 75 thereof (FIG. 5) adjacent a spring biased ball detent 76 which is mounted in the opening 77 of the head casing 12. The ball detent 76 engages the series of notches 72–74 as the cam 70 is rotated in response to rotation of the shaft lever 67. Thus, the detent positions the cam in one of three positions, namely, forward, neutral or reverse in response to the entry of the ball detent into one of the notches 72, 73 or 74 respectively, depending on the selected position of the shift lever 67.

A yoke 80 is provided for transmitting the oscillating movement of the shift lever 67 into a reciprocating shift positioning movement of the shift fork 58, along the shaft 55. The yoke 80 has a pair of aligned openings 81 in the legs thereof which slidably support the yoke on the shaft 55 with the base of the yoke 80 adjacent the end of the torque shaft 65 (FIG. 3). The end of the torque shaft 65 has a reduced concentric cylindrical portion 82 extending therefrom into a slot 83 for slidably supporting the yoke. The slot 83 is parallel to the shaft 55 upon which the yoke 80 is slidably mounted. An eccentric shift pin 84 is provided on the cam 70 and extends therefrom parallel to the axes of the torque shaft 65 into a vertical slot 85 in the yoke 80. The slot 85 is perpendicular to the slot 63 of the yoke 80.

With this interconnection between the torque shaft 65 and the yoke 80 through the cam 70 and the eccentric shift pin 84, it can be readily seen that oscillation of the torque shaft 65, by pivoting lever 67, will result in a similar oscillation of the eccentric shift pin 84 in the slot 85. The yoke will consequently be moved horizontally by the eccentric shift pin 84. Inasmuch as the yoke 80 is restricted to reciprocating motion by virtue of the supporting shaft 55 and the supporting concentric pin 82 in the slot 83, the yoke 80 will be reciprocated on the shaft 55 in response to the oscillation of the shift lever 67.

The reciprocating movement of the yoke 80 is transmitted to the shift fork 58 by either one of a pair of coil springs 86 and 87 (FIGS. 2 and 3). These springs 86 and 87 have one end thereof in engagement with the left and right legs of the yoke 80 respectively (FIGS. 2 and 3). The other ends of the springs 86 and 87 are positioned around a respective cylindrical surface 88 or 89 and against a shoulder 90 or 91 of the shift fork 58.

Thus, the reciprocating movement of the yoke 80 resulting from the oscillating positioning of the shift lever 67, as before described, will result in a spring engaged shift of the shift collar 45. More particularly, when the shift lever 67 (FIG. 5) is moved to the reverse position and cam notch 72, representing the reverse notch, will be held by the detent 76 and the yoke 80 will thereby be positioned to the left (FIGS. 2 and 5) on the shaft 55. This will result in an engagement of the shift collar clutch teeth 47 with the clutch teeth 37 of the reverse drive bevel gear 32 and will provide the reverse drive from the driving bevel gear 20 to the floating shaft 40.

When the gear train is in reverse condition, and engine torque is applied therethrough, a movement of the shift lever 67 from the reverse position to the neutral or forward position will result in movement of the yoke 80 from its left position (FIGS. 2 and 5) to extreme right or forward position. If the engine drive torque remains sufficiently high, a force will be applied between the meshing clutch teeth 36 and 47 and the shift collar 45 which will prevent disengagement of the reverse drive bevel gear 32. The spring 86 will be compressed and thereby apply a bias to the shift fork 58. When the engine torque is sufficiently reduced so as to release the force on the clutch teeth 36 and 47, the spring bias will cause the fork to move the shift collar 45 to a neutral position or to forceably complete engagement between the clutch teeth 48 and the forward drive bevel gear clutch teeth 38, to complete a forward drive train from the drive bevel gear 24 to the floating shaft 40. A similar operation will occur when the shift lever 67 is moved from forward to reverse or from neutral to either forward or reverse, regardless of the load condition, and the shift will eventually be accomplished without causing an improper meshing of gears under high torque conditions. This avoids any harsh destructive vibration in the linkage which would be felt by the operator through the shift linkage as he moved the shift lever 67.

The intermediate casing 13 illustrated in FIGS. 1, 2 and 4 is pivotally connected to the head casing 12 so as to pivot about the axes of the floating shaft 40 of the head casing 12. To this end it should be noted that the intermediate casing 13 has two concentric cylindrical inner surfaces 100 and 101 which are slidably mounted on a pair of complementing surfaces 102 and 103 on the periphery of the left and right bearing retainers 30 (FIG. 2). The head casing 12 and the intermediate casing 13 are thereby interconnected by a fulcrum or pivot joint so that the intermediate casing 13 will pivot about the axes of the shaft 40.

An annular sealing ring 104 is provided in each of the bearing retainers 30 to prevent lubricant from passing through the fulcrum connection between the head casing 12 and the intermediate casing 13. A cover plate 105 is secured on the right side of the intermediate casing 13 (FIG. 2) to enclose the cylindrical pivot surface 101. An enlarged annular portion 106 is formed on the left side (FIG. 2) of the intermediate casing 13 and a cover plate 107 is rigidly secured thereto to enclose the surface 100 and the opening presented by the enlarged annular portion 106. The cover plate 107 also acts as a bearing support for a bearing 108. A bevel gear 109 having teeth 110 is splined to the shaft 40 and is supported by the ball bearing 108. The bevel gear 109 and the shaft 40 are held against relative axial movement therebetween by retainer rings 111 appropriately placed on the bevel gear 109 and the shaft 40.

The intermediate casing 13 is provided with a bearing retainer 115 (FIGS. 1 and 2) which extends laterally therethrough. A roller bearing 116 is held by the bearing retainer 115. Another bearing retainer 117 is secured to the intermediate casing 13 by bolts 118 and is utilized to support a ball bearing 119. A bevel gear 120 is rotatably supported by the roller bearing 116 and the ball bearing 119 and has a set of teeth 121 in meshing engagement with the teeth 110 of the bevel gear 109. The bevel gear 120 has a splined internal passage 122 which is concentric with the axis of rotation thereof.

The bevel gear arrangement, just described, and the fulcrum connection between the intermediate casing 13 and the head casing 12, provide a forward and reverse drive train selectable by the shift lever 67 and which is complete from the driving bevel gear 20 to the shaft 40 regardless of the position of the intermediate casing 13 as it is pivoted about the fulcrum connection described above. Such pivoting of the intermediate casing 13 may occur in the event the propeller casing strikes an obstruction in the water or is otherwise moved to position the intermediate casing 13 relative to the head casing 12.

The propeller casing 14 is provided with a hollow cylindrical portion 130 (FIG. 2) which extends into a pair of aligned cylindrical cavities 131 and 132 in the bearing retainer 117 and the lower portion of the intermediate casing 13 respectively. The portion 130 is rotatably mounted in this position in the cavities 131 and 132 by bearings 133 and 134 respectively.

A helical gear 135 is formed on, or otherwise mounted to, the cylindrical portion 130 and has radial faces 136 and 137 thereof in contact with a radial surface 138 and 139 on the bearing retainer 117 and the lower portion of the intermediate casing 13 respectively. The gear 135 thereby retains the cylindrical extension 130 of the propeller casing 14, against longitudinal movement within the intermediate casing 13. The bearings 133 and 134 rotatably support the cylindrical extension 130 of the propeller casing 14 so as to permit the entire propeller casing 14 to be rotated within the intermediate casing 13.

A steering mechanism is provided for the drive unit which comprises a mechanism for rotating the casing 14 within the intermediate casing 13 in response to a steering wheel or similar device. A worm gear housing 145 is provided (FIGS. 1, 3 and 4) on the intermediate casing 13. A worm gear 146 is rotatably supported in the worm gear housing 145 by ball bearings 147 and bearings 148. The worm gear 146 has a set of teeth 149 in engagement with a set of teeth 150 of the spur gear 135 (FIG. 3). A flexible shaft 151 is drivingly connected at one end thereof to the worm gear 146 at 152, and at the other end thereof to a pulley coupling 153. The pulley coupling 153 is rotatably mounted in a bearing 154 which in turn is mounted in the transom 15 of the boat. The bearing 154 extends through the transom of the boat and is rigidly secured thereto by bolts 155. A flexible casing 156 has one end thereof secured to the worm gear housing 145 by flange 157 and the other end thereof secured to a plate 158 also held to the transom by bolts 155. The pulley coupling 153 is drivingly secured to a pulley shaft 159 which in turn is drivingly connected to a pulley 160. The pulley 160 is operatively connected to a steering wheel by cables or other means well known in the marine field which will cause the pulley to respond to a steering wheel.

It should be noted that by rotating the pulley, the flexible shaft 151 will rotate the worm gear 146 and thus the helical gear 135, to rotate the entire propeller housing 14 within the intermediate housing 13. Inasmuch as this drive between the pulley and the gear 146 is flexible, it is possible to rotate the propeller casing 14 within the intermediate casing 13 regardless of the pivoted position of the intermediate casing 13, relative to the head casing 12.

To extend the drive train from the bevel gear 120 through the propeller casing 14, there is provided a vertical propeller shaft 170 (FIGS. 1 and 2) having a splined upper end 171 drivingly engaging the splined internal passage 122 in the bevel gear 120. The shaft 170 has a lower end 172 rotatably mounted in a ball bearing 173. The ball bearing 173 is rigidly mounted in a bearing retainer 174 which is part of the propeller casing 14. A bevel gear 175 having teeth 176 is rigidly secured to the lower end 172 of the vertical propeller shaft 170 and is positioned in a cavity 177 in the propeller casing 14.

A horizontal propeller shaft 178 is rotatably mounted in bearings 179 and 180. The bearing 179 is mounted in the propeller housing 14 and the bearing 180 is mounted in a bearing retainer cap 181. The shaft 178 extends to the right beyond a propeller housing 14 (FIG. 1). A bevel gear 182 is drivingly mounted on the horizontal propeller shaft 178 and has a set of teeth 183 in meshing engagement with the teeth 176 of the bevel gear 175. A propeller 184 is keyed in a conventional manner to the horizontal propeller shaft 178 and is held against axial movement thereon by a nut 185 threaded onto the shaft 178. Thus, it can be seen that the reverse or forward rotary motion imparted to the bevel gear 120, as previously described, will be transmitted to the propeller 184 through the shaft 170 and bevel gears 175 and 182. Once again it is pointed out that this driving train will remain complete in all positions of the intermediate casing 13 and propeller casing 14, as the intermediate casing 13 is pivoted about the head casing 12.

It should be noted that although applicant has illustrated a one-to-one gear ratio drive train through the unit, the unit is not necessarily so limited. The bevel gear 20, or 109, may be reduced in size to provide a gear reduction in the drive train without resorting to adjacent offset drive shafts in the drive train. In the past it has been necessary to resort to such an offset in the drive shafts when a gear reduction was to be had. Applicant's drive unit allows the ending to be mounted with the drive shaft axis thereof in a central or other vertical plane of the boat with the intermediate drive shaft 170 operating in the same plane without any lateral horizontal offset.

Referring to FIGS. 4, 6, 7 and 8 there is illustrated a mechanism for releasably positioning the intermediate and propeller casings 13 and 14 in any one of several down positions. For purposes of illustration, only four such positions are described, although the mechanism is not necessarily limited to only four positions. For this purpose a bracket 205 is rigidly mounted to a flange 206 on the head casing 12 (FIGS. 4 and 6). The bracket 205 extends downwardly and away from the transom 15 to provide two projecting positions 207, one of which is on the left and one of which is on the right (FIG. 2) of the intermediate casing 13. A series of four notches 209, 210, 211 and 212 are formed in the bottom of each of the extensions 207 in a circular path having a center coincident with the pivot axis of the intermediate casing 13. The notches 209–212 on the left are respectively aligned with the notches 209–212 on the right.

It should be further noted that the propeller casing 14 comprises two sections; namely an upper section 142 and the lower section 146. These sections are held together along a parting line 190 by bolts 191 threaded into section 146. This divided arrangement of the propeller casing 14 provides a means whereby the length thereof can be adjusted by spacers (not shown) positioned between the sections 142 and 146 along the parting line 190. Also, this arrangement facilitates adjustment and other maintenance of the propeller shaft 178 and the bearings 179 and 180.

A pair of hooks 213 are rigidly secured to the sides of the intermediate casing 13 (FIGS. 4, 6 and 7) and each hook 213 has an opening 214. The hooks 213 are so positioned on the intermediate casing 13 that the respective openings 214 are aligned with each other and can be made to align with any pair of the aligned notches 209–212 in respective bracket extending portions 207 by adjustably pivoting the intermediate casing 13 about the head casing 12. It should be noted that the hook openings 214 open downwardly and forwardly so that there is a forwardly projecting shoulder 215 adjacent the lower portion of the opening 214.

A pair of U-shaped links 216 (FIGS. 2–6 and 7) are provided which are pivotally and slidably mounted in respective extensions 207 by means of a pin 217 rigidly secured to each link 216 and slidably inserted in a slot 218 in the extensions 207. The slot 218 is positioned along a radius of the common pivot axis of the intermediate and head casings 13 and 12. Each pin 217 (FIG. 2) has a flange 219, cylindrical body 220, a shoulder 221 and a reduced threaded end portion 222. The flanges 219 are positioned on the inside of the respective bracket projections 207 with the cylindrical body 220 slidably positioned in the respective slots 218, the reduced threaded end portion 222 extending through an opening 223 in the adjacent link 216 and the shoulder 221 abutting the inside of the respective links 216. The retainer pins 217 are secured to the respective links 216 by a nut 224 which is tightened against the links 216.

The links 216 are interconnected by a lock rod 225 (FIGS. 1–6 and 7) which is inserted in pairs of aligned openings 226 in the links 216. The rod 225 is held in place by pins 227 at each end thereof. It should be noted that the rod spans the two sets of aligned notches 209–212 and is adapted to fit in the aligned notches 209–212 and the aligned hook openings 214. For purpose of illustration, the lock rod 225 is shown positioned in the aligned notches 209 which represents the forward most position of the intermediate casing 13, with the propeller shaft 170 held in a substantially vertical position.

Thus, the links 216, lock rod 225 secured thereto, and the retainer pins 217 secured to the links 216, form a rigid framework which is vertically movable to the extent of the length of the slots 218 in the bracket projections 207. The length of the slots 218 is sufficient to allow the lock rod 225 to move downwardly beyond the aligned notches 209 and the aligned openings 214, to allow repositioning movement of the lock rod 225 in one of the other pairs of aligned notches 210, 211, or 212. It should be noted that the lock rod 225 will release the hook 213 without the lock rod 225 being completely removed from the selected positioning notches 209, inasmuch as the upper portion of the hook opening 214 does not extend downwardly as far as the notches 209–212. This allows a position index determined by a pair of aligned notches 209–212 to be maintained while the intermediate casing 13 is pivoted counter-clockwise (FIGS. 7 and 8) about the head casing 12. Upon return of the casing 14 to its down position the lock rod will position the casing 14 so as determined.

A pair of spring retainers 230 (FIGS. 2, 4 and 7) each have a passage 231 by which the retainers 230 are rotatably mounted on the respective retainer pins 220. The spring retainers 230 are slidably movable in respective openings 232 in an arcuate portion 233 of the respective bracket projections 207. A compression spring 234 is retained on each of the spring retainers 230, between the arcuate surface 233 and an enlarged upper portion 235 of the spring retainer 230. The compression springs 234 tend to force the spring retainer 230 upwardly with respect to the arcuate surface 233 and thereby tend to force the respective spring retainer pins 217 upwardly in the slots 218. The pins 217 in turn urge the lock rod 225 into the selected notch 209 of the series of notches 209–212 and the openings 214 of the hooks 213.

Thus, a spring bias lock or detent is provided for holding the intermediate casing 13 against rotation about the head casing 12, but which is releasable by movement of the lock rod 225 against the action of the compression spring 234. This feature is important in the event that an obstruction is engaged by the propeller casing 14. In that instance the intermediate casing 13 would be urged to the right (FIGS. 6 and 7) resulting in a force exerted by the upper side of the hook opening 214 against the lock rod 225 to force the lock rod 225 against the incline sides of the notches 209 and thereby tend to force the lock rod 225 out of the notches 209 and the hook opening 214, against the force of the compression spring 234. If the obstruction force thus exerted is sufficient, the lock pin will be forced completely out of the hook opening 214 and the intermediate casing will be free to rotate counter-clockwise (FIGS. 6 and 7) to allow the intermediate and propeller casing 13 and 14 to kick-up. Thus the unit can be releasably positioned in any one of the notches 209–212.

It should be noted that the shoulder portion 215 on the hooks 213, will tend to hold the lock rod 225 in any pair of the selected notches 209–212 when the intermediate casing 13 is urged clockwise about the head casing 12. This situation would occur when the propeller exerts reverse thrust and would tend to hold the lock rod 225 tightly in the selected grooves 209 instead of forcing it out of the grooves as would a force exerted against the intermediate casing 13 in a counter-clockwise direction, as by an obstruction as previously described.

This embodiment of applicants' invention provides a means for moving the lock rod 225 to release its locking effect on the intermediate casing 13, and to raise the intermediate casing 13 by causing it to pivot about the head casing 12. To this end there is provided a bracket 240 secured to the inside of the transom 15 (FIG. 6) and extending inwardly therefrom. A lever 241 is pivotally mounted to the bracket 240 by means of a pin 242. A pawl 243 is pivotally mounted to the lower end of the lever 241 on a pin 244. The pawl 243 has a flat sided tooth 243a and is pivotally connected to a release rod 245 at 246.

The release rod 245 extends upwardly through a hand grip 247 formed on the upper portion of the lever 241 and terminates in a release button 248. The release rod 245 is spring biased upwardly by a spring (not shown) contained in the hand grip 247 so as to urge the pawl 243 against the bracket 240. The bracket 240 is provided with a ratchet pattern 249 formed on a partial circle having an axis coincident with that of the pivot pin 242. The ratchet pattern 249 comprises a series of teeth 250 having a directional characteristic to the extent that one side 251 is inclined to the radius of the ratchet pattern and one side 252 is positioned radially with respect to the radius of the ratchet pattern. The tooth 243a of the pawl 243 has one side 253 which is adapted to complement the radially positioned sides 252 of the ratchet teeth 250 and another side 254 which is adapted to clear the inclined tooth sides 251.

By pivoting the lever 241 counter-clockwise (FIG. 6) the tooth 243a of the pawl 243 will be urged into racheting engagement with the ratchet pattern 249, by the bias in the release rod 245. In order to return the lever or otherwise pivot it in a clockwise direction from a counter-clockwise position, it would be necessary to release the pawl 243 from the ratchet pattern by depressing the release button 248 to force the pawl 243 out of the ratchet pattern. Thus the lever 241 can be adjustably moved in a counter-clockwise direction at will, but will be releasably held against a clockwise rotation by virtue of the ratchet 249 and the pawl 243.

A partial drum 260 having an axis parallel to the pivot axes of the lever 241, is rigidly secured to the lever 241 by a bar 261. Thus, by oscillating the lever 241 in a counter-clockwise direction about the pin 242 the drum 260 will be oscillated likewise. A cable 262 is pivotally connected to the upper portion of the drum 260 at 263, and extends through the transom 15 and a guide-way 264 on the casing 13. The other end of the cable 262 is pivotally connected to a pair of levers 265 at 264a. The levers 265 are pivotally mounted on the sides of the intermediate casing 13 by means of bolts 266 (FIGS. 4 and 6). The levers 265 are interconnected by a bar 265a so that the levers will pivot together on the bolts 266.

The levers 265 have a cam surface 267 and a flat portion 268. By pivoting the lever 241 counter-clockwise (FIG. 6), the cables 262 will be taken up on the partial drum 260 and as a consequence, the levers 265 will be pivoted counter-clockwise until the flat surfaces thereof engage a stop 269 on the respective sides of the intermediate casing 13. During this counter-clockwise movement of the lever 265, the cams 267 will engage the respective retainer pins 217 (FIG. 7) and move the retainer pins downwardly in the respective slots 218 against the resistance of the respective compression springs 234, and release the lock rod 225 from its locking position in the openings 214 of the hooks 213.

Thus, the movement required to pivot the lever 265 from the position shown in FIG. 6 to that shown in FIG. 7, will cause the release of the positioning lock rod. A continued counter-clockwise pivotal movement of the lever 241 will cause the cable 262 to raise the intermediate casing 13 inasmuch as the lever 265 is restrained against further rotation in the counter-clockwise direction by the stops 269. FIG. 8 illustrates the extreme up position of the intermediate casing 13 when the lever 241 is pivoted counter-clockwise to the maximum position. The intermediate casing 13 will be retained in this position by the ratchet and pawl 249 and 243, as previously described.

In operation, to manually raise the intermediate casing 13 and thus raise the propeller casing 14 out of the water by pivoting it about the head casing 12, the release button 248 is depressed to release the pawl 243 from the ratchet 249, the lever 241 is rotated counter-clockwise to cause the levers 265 to release the lock rod 225 from the hook 213. Continued counter-clockwise rotation of the levers 241 will pivot the intermediate casing 13 about the head casing 12 to a selected position determined by the ratchet and pawl 249 and 243 with the extreme position being that shown in FIG. 8.

It is to be noted that the lever and ratchet means previously described, can be used to raise the casings 13 and 14 from any one of the down positions defined by the notches 209–212 to an intermediate position determined by the ratchet 49 in the event that the boat is to be operated in shallow water. In any such intermediate position, the propeller and intermediate casings 14 and 13 may kick up upon hitting an obstruction, inasmuch as these casings are free to pivot counter-clockwise about the head casing 12, although held against clockwise rotation by the ratchet mechanism.

A positive reverse lock mechanism (FIG. 4) is provided in this embodiment of applicants' invention, to prevent the rotation of the intermediate and propeller casings 13 and 14 about the head casing 12 when the reverse drive train is completed. This positive reverse lock includes a hook 275 (FIG. 4) pivotally mounted to the right bracket projection 207 (FIG. 2) by a bolt 276. The hook 275 is urged upwardly by a tension spring 277 which is anchored to a pin 278 in the hook 275 and an opening 279 in the bracket 205.

The outer end of the hook 275 has a tip 280 projecting laterally therefrom and adapted to engage any one of a series of teeth 281 formed in a bracket 282 which is rigidly secured to the casing 13 by a pair of bolts 283. The teeth 281 are positioned on the bracket 282 so as to correspond with the positions determined by the notches 209–212 of the break-away, previously described. The transmission will thereby be normally held against break-away by virtue of the spring biased hook 275 engaging the corresponding tooth 281 in each selected break-away position.

A rod 284 is pivotally connected to the hook 275 at 285 and (FIGS. 3 and 4) terminates in a ball socket 286. A lever 288 is secured to a shaft 289 which is rotatably mounted in a passage 290 of the head casing 12 (FIG. 4). A reverse lock cam follower 291 is rigidly secured to the other end of the shaft 289 by means of a nut 292 threaded on the end of the shaft 289 (FIGS. 3, 4 and 5). The reverse lock cam follower 291 terminates in a tip 293 extending laterally therefrom (FIG. 5) toward the cam 70 of the shift linkage. The cam 70 has a raised cam surface 294 and a depression surface 295 on the side thereof adjacent the follower tip 293.

In operation of the reverse lock, above described, the control lever 67, when moved to the reverse (REV.) position (FIG. 5), the cam surface 294 will be rotated out of engagement with the follower tip 293. Under these conditions, the tension spring 277 will urge the rod 284 upwardly and pivot the lever 288 counter-clockwise (FIG. 5) and move the tip 293 against the depressions surface 295. Thus, the cam 70 will allow the hook 275 to pivot about the bolt 276 under the force exerted by the spring 277 and the tip 280 will move into positive locking engagement with a tooth 281 which represents one of the positions of reverse lock. The shifting of the transmission into reverse will thereby lock the intermediate casing and propeller casing 13 and 14 against clockwise rotation (FIG. 4).

When either the forward or neutral positions are selected by the control lever 67, the cam 70 will be rotated so that the cam surface 294 will engage the cam follower tip 293 and rotate the cam follower 291 and the lever 288 in a clockwise direction. This movement of lever 288 will pivot the hook 275 counter-clockwise about the bolt 276 and thereby release the hook tip 280 from engagement with the selected tooth 281 to allow the intermediate and propeller casings 13 and 14 to rotate clockwise about the head casing 12, except for the releasable force exerted by the break-away lock rod 225.

Thus, it can be seen that when the control lever 67 is rotated to the reverse position, the intermediate and propeller casings 13 and 14 will be held against clockwise rotation (FIG. 4) and allow the boat to be driven in reverse. When the control lever 67 is moved to either forward or the neutral position, the reverse lock hook 275 will be released to allow the unit to be held by the releasable lock rod 216 subject to kick-up upon hitting an obstruction.

Another embodiment of applicants' invention is illustrated in FIGS. 9, 10 and 11 and provides the reverse lock and break-away detent, previously described, and illustrated in reference to FIGS. 2–8. The present embodiment is designated as a worm gear raise up and is an adjustment for pivotally positioning the intermediate and propeller shafts 13 and 14 about the head casing 12. This raise-up includes, among other things, a bearing retainer 300 (FIGS. 9 and 10) which is substituted for the cover plate 107 (FIG. 2).

The retainer 300 is secured to the enlarged flange portion 106 of the intermediate casing 13 and supports the bearing 108 and bevel gear 109. A pilot hub 301 is provided on the bearing retainer 300 and has a cylindrical surface 302 extending outwardly therefrom about the axes of the idler shaft 40. A stop 303 provides a partial cylindrical surface 304, coincident with the surface 302 of the hub 301, and a flat chord surface 305.

A segmented gear 306 is rotatably mounted on the coinciding cylindrical surfaces 302 and 304. A snap ring 307 is provided on the stop 303 to retain the segmented gear 306 on the cylindrical surfaces 302 and 304. The gear 306 has an internal cylindrical surface 308 with a driving tang 309 projecting radially inward therefrom. The driving tang 309 has a pair of flat surfaces 310 and 311 which respectively complement the upper surface and lower surface of the stop 303 when the segmented gear 306 is rotated counter-clockwise or clockwise, respectively. A pair of lugs 312 and 313 are provided on the segmented gear 306 which are adapted to engage a stop 314 secured to a worm gear housing 315 to limit the rotational movement of the gear.

The worm gear housing 315 is rigidly secured to the bearing retainer 300 and rotatably supports a worm gear 316 having a set of teeth 317 in meshing engagement with teeth 318 of the segmented gear 306. The worm gear 316 is connected to a shaft structure 319 which extends through the transom 15 and is drivingly connected to a crank 320. Rotation of the crank 320 in a clockwise direction, looking towards the stern of the boat, will rotate the worm gear 316 so as to cause the segmented gear 306 to rotate counter-clockwise (FIG. 9). Similarly, the counter-clockwise rotation of the crank 320 will cause a clockwise rotation of the segmented gear 306.

Gravity urges the intermediate and propeller casings 13 and 14 in a clockwise direction so that the upper portion of the chord surface 305 will normally engage the flat surface 310 of the tang 309. The position of the tang 309 will thus determine the maximum down position of the intermediate and propeller casings 13 and 14. It is to be noted that the stop 303 is free to rotate from this position to one where the lower portion of the chord surface 305 is in engagement with the flat surface of the tang 309 in the event the unit strikes an obstruction and the intermediate and propeller casings are thereby urged counter-clockwise about the head casing 12.

In operation, to lower casings 13 and 14 from the raised position shown in FIGURE 9, to the intermediate position represented in FIG. 11 or to a down position, the crank 320 is rotated in a counter-clockwise direction looking towards the stern of the boat, resulting in a clockwise rotation of the segmented gear 306 in response to the worm gear 316. The gravitational effect on the casings 13 and 14 will cause a clockwise rotation of the casings 13 and 14 and the stop 303 thereof, in a clockwise direction with the upper portion of the chord surface 305 in engagement with the flat surface 310 of the driving tang 309. Thus, any intermediate or down attitude of the casings 13 and 14 will be obtained as indicated in FIG. 11. In the substantially down positions of the intermediate and propeller casings 13 and 14, the reverse lock and break-away mechanism will be effective in their normal manner to releasably retain the casings.

Figure 12:
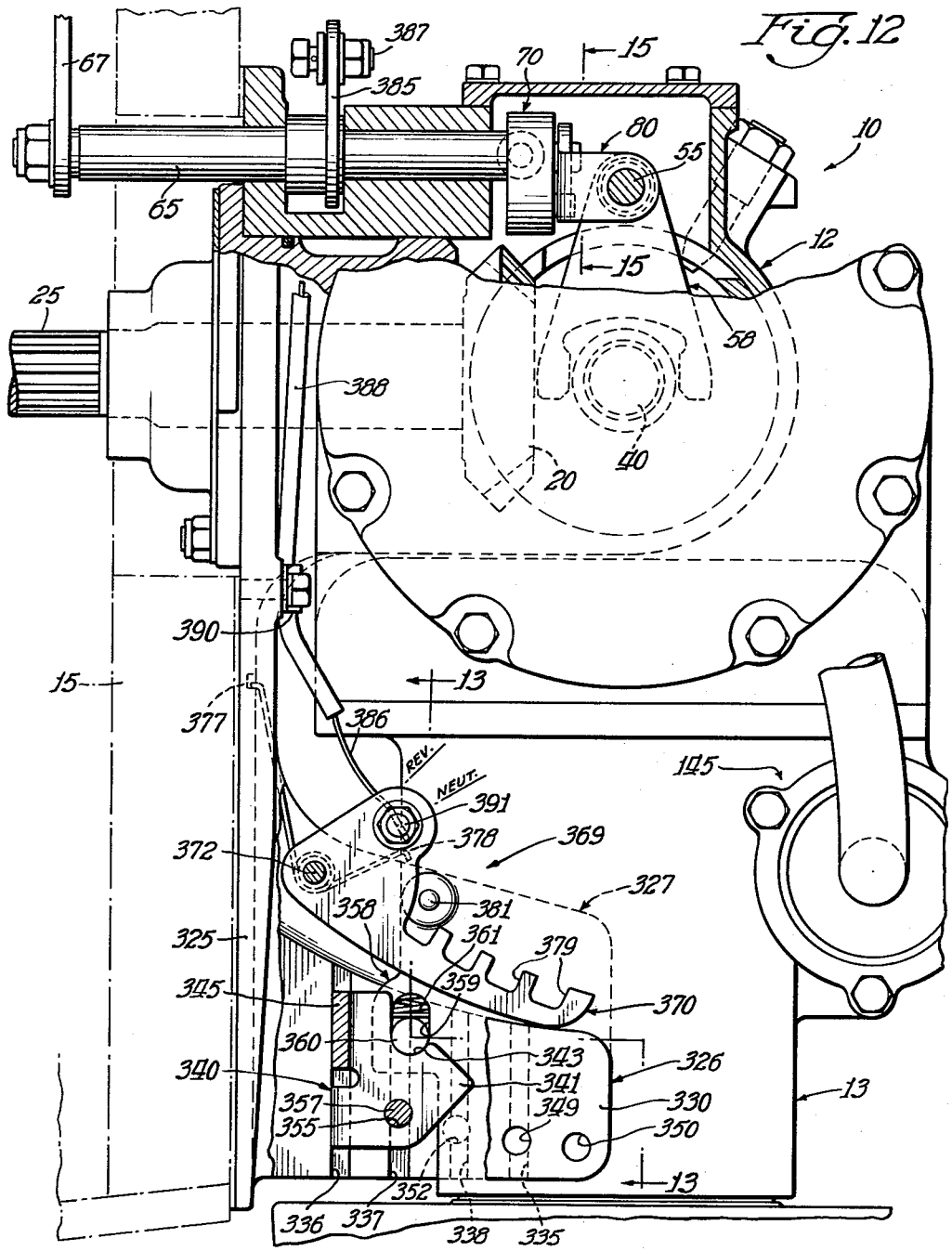
FIG. 12 is a partially sectioned side view of the drive unit showing the shifting linkage for the drive train and an interconnected adjustable reverse lock.

FIGS. 12, 13 and 14 illustrate another embodiment of applicants' stern drive having a break-away and reverse lock mechanism in conjunction with either the ratchet or the worm gear positioning mechanism as previously described.

The break-way mechanism shown in FIGS. 12–14 includes, among other things, a plate 325 mounted on the transom 15 having a pair of brackets 326 and 327 extending substantially perpendicular therefrom and respectively adjacent the left and right sides of the intermediate casing 13 (FIG. 14). The brackets 326 and 327 comprise an upper wall portion 328 and 329 and an enlarged bottom portion 330 and 331 respectively. A series of four vertical parallel slots 332, 333, 334, and 335 are formed in the inner portion of the enlarged bottom portion 330 of the bracket 326 and are respectively opposed and laterally aligned with a similar set of slots 336–339 in the enlarged bottom portion 331 of the bracket 327.

A bracket 340 is provided which terminates in a pair of stops 341 and 342 which extend perpendicular thereto and have aligned notches 343 and 344 respectively in the upper portions thereof. The bracket 340 has a pair of outwardly projecting lugs 345 and 346 which are adapted to slidably fit into the respective opposed pairs of slots 332–335 and 336–339 respectively which retain the bracket 340 and the hooks 341 and 342 thereof against fore and aft motion (FIGS. 12–14). For purposes of illustration the bracket 340 is shown with the lugs 345 and 346 thereof positioned in the forwardmost pair of aligned slots 332 and 336. This provides the maximum forward position of the intermediate and propeller casings 13 and 14 (FIGS. 12–14).

A series of four passages 347, 348, 349 and 350 are formed in the left bottom portion 330 of the bracket 326. Similarly, the bracket 327 has four passages 351, 352, 353 and 354 formed in the right bottom portion 331 thereof in respectively aligned relation with the left passages 347–350 of the bracket 326. A pair of aligned holes 355 and 356 are provided in the hooks 341 and 342 respectively so that by positioning the bracket 340 vertically, the holes 355 and 356 will align with a pair of respective passages 347–350 and 351–354. The hook holes 355 and 356 are shown (FIGS. 12 and 13) in alignment with passages 347 and 348 by reason of the bracket 340 being vertically positioned in the forward pair of opposed slots 332 and 336. A pin 357, which is slidably insertable in any given pair of the pairs of respectively aligned passages 347–350 and 351–354 and the hook holes 355 and 356, is shown in the hook holes 355 and 356 and the aligned passages 347 and 351 (FIGS. 12, 13 and 14). The pin thereby holds the bracket 340 against vertical movement.

The intermediate casing 13 is provided with a break-away pin housing 358 on the front thereof (FIG. 12) which has a vertically elongated slot 359 running transversely therethrough (FIGS. 13 and 14) which is adapted to slidably retain a break-away pin 360. A pair of springs 361 are retained in passages 362 in engagement with the break-away pin 360 to urge the pin 360 downward in the slot 359. Thus, the pin 360 is forced into the hook notches 343 and thereby creates a break-away detent by which the intermediate and propeller casings 13 and 14 will be releasably held in a position determined by the positon of the hook 341 in the brackets 326 and 327.

This embodiment of applicants' invention also includes a reverse lock mechanism 369 comprising, among other things, a pair of hooks 370 and 371 rigidly mounted in aligned relation on a shaft 372 which is rotatably secured in openings 373 in the brackets 326 and 327. A spiral spring 376 is positioned on the shaft 372 with one end anchored in the plate 325 at 377 and the other end anchored in an opening 378 in the hook 371. The spring 376 acts to bias the hooks 370 and 371 in a clockwise direction (FIG. 12).

Two sets of four notches 379 and 380 are provided in the hooks 370 and 371 respectively. A reverse lock pin 381 is provided on each side of the intermediate casing 13 and extend outwardly therefrom adjacent respective notches 379 and 380. Each of the notches of the series 379 and 380 is individually adapted to receive the adjacent pin 381, depending on the position of the intermediate casing 13 when the hook 370 is rotated counter-clockwise. In the locked condition, the intermediate and propeller shafts 13 and 14 will be held against counter-clockwise rotation and will be prevented from raising out of the water while operating the drive unit 10 in reverse.

A mechanism is provided to maintain the reverse lock 369 in an unlock condition (FIGS. 12 and 15) when the forward drive train is completed. The intermediate casing and propeller housing 13 and 14 can thereby kick-up upon hitting an obstruction. This mechanism comprises a lever 385 keyed to the torque shaft 65 and extending laterally therefrom. The lever 385 will oscillate with the torque shaft 65 and the shift lever 67 when the transmission is shifted. A flexible wire 386 is pivotally connected to the lever 385 by a swivel bolt 387. The flexible wire 386 passes slidably through a guide-tube 388 which is held on the head casing 12 and plate 325 by brackets 389 and 390 respectively. The other end of the flexible wire 386 is pivotally connected to the hook 370 by a swivel bolt 391 (FIGS. 12 and 13).

In operation, when the shift lever 67 (FIG. 15) is moved to the reverse position (REV.), the lever 385 will be pivoted clockwise which in turn will pivot the hooks 370 and 371 counter-clockwise about the axis of the shaft 372 to raise the hooks 370 and 371 into locking position on the reverse lock pins by the interconnected flexible wire 386. Similarly, when the shift lever 67 is pivoted counter-clockwise to the forward position, (FOR'D) the lever 385 is likewise pivoted, which in turn pivots the hooks 370 and 371 clockwise about the axis of the pin 372 and removes the hooks 370 and 371 from locking engagement with the respective reverse lock pins 381 by reason of the interconnected wire 386 and the spring 399. Thus, by virtue of the reverse lock mechanism, above described, the intermediate and propeller housings 13 and 14 will be locked into one of four positions only when the reverse drive is completed and otherwise will be free to kick-up in the neutral and forward conditions thereof.

Another embodiment of applicants' invention is illustrated in FIGS. 15–18 wherein the drive unit generally designated by the numeral 10, is directly connected to an engine housing 392 through an opening 393 in the transom 15. In this embodiment the shift lever 67 is used to shift from neutral to forward or reverse as previously described in a manner similar to that previously described which likewise reciprocated the flexible wire 386 in the guide-tube 388. The flexible wire 386 is attached to one of a pair of rigidly interconnected hooks 394 by a swivel bolt 395.

The rigidly interconnected hooks 394 are pivotally mounted on a pair of pins 396 which in turn are rigidly secured in openings 397 of a bracket 398 which is rigidly secured to the engine housing 392 (FIG. 18). A spiral spring 399 is mounted on the left pin 396 (FIGS. 16 and 17) and is anchored in the bracket 398 at 400 and to the hook 394 at 401. The spring 399 is under tension so that it acts to urge the hook 394 clockwise about the pins 395. The hook 394 has extending portions 402 with notches 403 formed therein which are adapted to receive a pair of pins 404 which extend outwardly from the intermediate casing 13 (FIG. 18). When the shift lever 67 is rotated to the reverse position (REV.), the hook 394 will be pivoted counter-clockwise about the axes of the pins 395 (FIG. 18) and the notches 403 will receive the pins 404. This will lock the intermediate casing 13 against counterclockwise rotation about the head casing 12 when the casing 13 is in the down position. Thus, the unit 10 can be driven in reverse without the propeller force raising the intermediate casing 13 out of the water.

The intermediate casing 13 is releasably held in the down position, when the hook 394 is released from the lock position, by a pair of cylindrical detents 405 which are slidably mounted in a passage 406 in the extended portion 407 of the intermediate casing 13. A compression spring 408 is retained in an opening 409 in each detent 405 so that the detents 405 are urged apart. Each detent 405 has a key-way 410 on the side thereof which is adapted to receive a pin 411. The pins 411 co-act with the key-ways 410 to limit the movement of the detents 405. The bracket 398 in which the pins 396 are secured, is provided with a pair of opposed cavities 412 to receive the respective detents 405 when the intermediate casing 13 is in down position (FIGS. 17 and 18).

In operation, the detents 405 will enter the adjacent cavities 412 when the intermediate casing 13 is in the down position and will thereby releasably retain the casing 13 in a manner allowing the casing 13 to kick-up or otherwise rotate counter-clockwise upon hitting an obstruction. Thus, the intermediate casing 13 is always releasably retained by the detents 405 when in the down position and will be automatically locked in down position by the hooks 395 when the drive unit is in reverse.

Another embodiment of applicant's invention is illustrated in FIGS. 19-24 wherein a drive unit is provided which has a drive train similar to that previously described in reference to the embodiment illustrated in FIGS. 1-5. More particularly, this embodiment of the drive unit includes a head casing 415 and an intermediate casing 416. The head casing has a cylindrical passage 417 extending laterally therethrough which has a pair of cylindrical sleeves 418 positioned therein and secured against movement by a pair of locking screws 419. The intermediate casing 416 has opposed aligned cylindrical passages 420 in an upper yoke portion thereof which are adapted to receive the sleeves 418 for providing a fulcrum connection between the intermediate casing 416 and the head casing 415.

A reverse drive bevel gear 421 and a forward drive bevel gear 422 are rotatably mounted in a pair of bearings 423 within the cylindrical sleeve 418 (FIG. 19), in very much the same fashion as were the reverse drive bevel gear 32 and the forward drive bevel gear 33 of the prior embodiment illustrated in FIGS. 1-5. Also, an idler shaft 424 is rotatably mounted within the reverse and forward bevel gears 422 and 423 respectively, which is keyed to a bevel gear 425. Gear 425 is comparable to the bevel gear 109 of the previous embodiment (FIGS. 1-5) and is adapted to drive the propeller in the manner previously described. A collar 426 is slidably splined to the idler shaft 424 and is adapted with reverse drive clutch teeth 427 and forward drive clutch teeth 428 for positively engaging clutch teeth 429 and 430 of the reverse or forward drive bevel gears, when moved to the left or to the right respectively (FIG. 19). This will in turn impart either a reverse or forward drive to the propeller through the gear 425.

The present embodiment of applicant's invention provides a shift linkage mechanism for shifting the collar 426 on the shaft 424 to provide the desired forward and reverse drives or the neutral condition. This shift mechanism includes a shaft housing 415a secured to the top of the head casing (FIGS. 18 and 19). A shaft 431 is rotatably mounted in the housing 415a and terminates at the upper end in a shift lever 432. The shaft 431 is keyed to an upper hub 434 which in turn has three annular spring retainers 435 rigidly fixed to the periphery thereof, each of which retains a spring 436. A lower hub 437 is rotatably mounted on the shaft 431 and has three equally spaced lugs 438 extending axially upward therefrom between the springs 436 held in the spring retainers 435. It should be noted that each spring retainer has a slot 439 in each end thereof to permit the lugs 438 to enter the spring retainers 435 and compress the springs in the event the spring retainers are moved by rotation of the shift lever 432 and the lugs are held stationary by a reaction from the gear train.

A collar actuating link 440 is provided which has a lug 441 extending into a groove 442 in the collar 426. The collar actuating link 440 has a shaft 443 which is rotatably mounted in the lower hub 437. A ball detent 444 is provided in the shaft retainer 415a and is adapted to selectively engage one of three openings 445-447 provided in a flange 448 which is an extension of the forward or leftmost spring retainer 435 (FIGS. 18-20 and 22). The openings 445-447 determine forward, neutral and reverse positions of the shift lever 432 which are indicated as "F," "N" and "R" respectively (FIGS. 21 and 23).

In operation, the collar 426 may be shifted from neutral position (FIGS. 20, 21 and 23) to either the reverse or forward drive position by movement of the shift lever 432 from the neutral to the forward or reverse position (FIGS. 21 and 23). Assuming, for purposes of illustration, that the shift lever is moved from the neutral position to the forward position. This will cause the shaft 431 to rotate counter-clockwise (FIGS. 21 and 23) and consequently cause the upper hub 434 and spring retainers 435 to move counter-clockwise. This movement will urge the springs 436 clockwise which in turn will urge the lugs 438 counter-clockwise. When the lugs are urged in this manner the collar actuator 440 will be moved to the right (FIG. 20) to cause the positive engagement of the forward drive bevel gear 424 and the collar 426 to lock the forward drive bevel gear to the shaft 424 and thereby provide a forward drive.

To shift from forward to reverse, the shift lever 432 is moved from the forward to the reverse position (FIGS. 21 and 23). This results in a movement of the spring retainers 435 in a clockwise direction which will urge the springs 436 against the lugs 438 to urge the collar actuator 440 and thus the collar 426 toward the reverse drive bevel gear 421. When the torque is being applied to the forward bevel gear there will be a reaction between the forward bevel gear and the collar, tending to prevent separation thereof. Under these circumstances, when the lever 432 is moved from the forward position to the reverse position the lugs 438 will not move and the spring retainer 435 will compress the springs 436 against the lugs 438. This compression force in the springs 436 will remain until the torque transmitted through the forward bevel gear is reduced to a predetermined minimum. Thereupon, the spring force will overcome the force resulting from the driving torque and the collar will be released from the forward drive bevel gear and will snap into engagement with the reverse drive bevel gear. A similar operation will occur when the shift lever 432 is moved from reverse to forward or from neutral to either forward or reverse.

It should be noted that this embodiment of the invention provides a means for shifting directly between forward and reverse and from neutral to forward or reverse only when the torque applied through the drive train is below a given minimum. Further, it should be noted that although the shift will not be completed until the torque is sufficiently reduced, the shift lever 432 is free to be moved to its selected position under any load conditions without causing a destructive or harsh improper meshing of gears. This prevents unpleasant vibrations which would otherwise be felt by the operator when he moves the shift lever 432 to a selected position.

The present embodiment of applicants' invention also provides a means for locking the intermediate casing 416 against pivotal movement about the head casing when the drive train is in reverse condition. Also, this embodiment provides a means for releasably retaining the intermediate casing 416 in the down position when the drive train is in neutral or forward condition. For these purposes, the shift lever is provided with an extension 455 which has a recess 456. The recess 456 is adapted to engage an extension 457 of a torsion coil spring 458 when the shift lever 432 is rotated clockwise (FIG. 23). The spring 458 is loosely mounted on the head casing, by means of a pin 459. The other end of the spring 458 is pivotally connected to a shaft 460 which in turn is adapted with a piston 461 at the lower end thereof (FIG. 23). The piston 461 is slidably mounted in an extension 462 of the head casing 415. A pin 463 is secured to the piston 461 and extends through the slot 464 in the head casing extension 462. A latch 465 is pivotally mounted on the intermediate casing 416 by means of a pin 466 extending therefrom and is spring biased in a clockwise direction by a torsion coil spring 467. The latch 465 is provided with a notch 468 which is adapted to receive a lock pin 469 extending from the intermediate casing 416, when the intermediate casing is in down position (FIG. 24). It should be noted that detents 405 (previously described) are utilized in this embodiment to releasably retain the intermediate casing 416 in the down position.

In operation, to lock the intermediate casing 416 in the down position (FIG. 24) the lever arm 432 by necessity must be moved to the reverse position (FIG. 22) whereupon the extension 455 will engage the upper end of the first spring 458 and urge the spring 458 counter-clockwise about the pin 459 (FIG. 24) to urge the shaft 460 downwardly. As a consequence the pin 463 will be moved downwardly in the slot 464 and thereby rotate the latch 465 counter-clockwise about its pivot pins 466 (FIG. 24). Whereupon, the notch 368 will move to an upper position and the latch notch 468 will engage the pin 463 and lock the intermediate casing in the down position. Thereafter, the reverse force applied by the propeller cannot cause counterclockwise pivoting of the intermediate casing 416 about the head casing 415.

When the shift lever 432 is rotated to the forward position (FIG. 23) the lever extension 455 will be released from engagement with the spring extension 457, which will release any torsional force otherwise applied by the spring 458. Under these circumstances the second spring 467 will be free to urge the latch clockwise about the pin 463 in lieu of any force applied to the latch 465 by pin 466. The notch 468 in the latch 465 will then be removed from the pin 463 and will free the intermediate casing 416 to allow it to pivot about its pivot axis through the head casing 415 except for the force applied by the detents 405 which releasably hold it in the down position.

Thus, it can be seen that when the shift lever 432 is rotated to the reverse position to put the drive train in reverse, the latch 465 will lock the intermediate casing 416 in position. Similarly, when the shift lever is rotated to the forward or neutral position, (FIG. 23) the latch 465 will remove itself from the pin 463 and leave the intermediate casing 416 releasably held by the detents 405.

Applicants' embodiment illustrated in FIGS. 1–5 can be utilized in conjunction with an inboard transmission instead of having a separate transmission contained therein (FIGS. 25–27). In this instance the head casing 12 can be mounted on the transom 15 in the above described manner and the drive shaft 25 thereof connected directly to a flexible coupling 475, which in turn, is connected directly to the driven shaft of a transmission 476 (FIG. 25).

In this embodiment of applicants' invention, the shifting mechanism is omitted and a fixed ratio gear train is provided (FIG. 26). The bevel gear 20 which is driven by the engine, is drivingly connected to a bevel gear 477 which is rotatably supported in the head casing 12 on bearings 478. A shaft 479 is splined to the bevel gear 478 and a bevel gear 480 is rotatably mounted in the head casing 12 on bearings 481 and is splined to the shaft 479. The bevel gear 480 in turn drives the vertical propeller shaft 170 through a bevel gear 482.

It should be noted that although applicant has illustrated a one-to-one gear ratio drive train through the unit, the unit is not necessarily so limited. The bevel gears 20 and 480 may be reduced in size to provide a gear reduction in the drive train without resorting to adjacent offset drive shafts in the drive train. In the past it has been necessary to resort to such an offset in the drive shafts when a gear reduction was to be had. Applicants' drive unit allows the engine to be mounted with the drive shaft axis thereof in a central or other vertical plane of the boat with the intermediate drive shaft 170 operating in the same plane without any offset.

It should be noted that a worm gear raise-up similar to that previously described (FIGS. 9, 10 and 11) and generally designated by the numeral 483 (FIG. 20) is provided for adjustably pivoting the intermediate casing 13 about the head casing 12.

A reverse lock piston 485 (FIG. 27) is slidably mounted in a vertical passage 486 in the head casing 12. A flexible tube 487 (FIG. 25) is connected to a tube 488 (FIG. 19) which is threaded into an inlet passage 489 in the head casing 12. The other end of the flexible tube 487 is connected with the reverse fluid pressure system of the transmission 476 so that when the transmission is placed in reverse condition by a lever 490, fluid under pressure is supplied from the transmission 476 through the flexible hose 487 and tube 488 into the inlet passage 489 of the head casing 12. A passage 491 is provided in the head casing 12 to interconnect the inlet passage 489 and the cylindrical passage 486. Inasmuch as the passage 486 is thus connected with the reverse fluid pressure system of the transmission 476, fluid under pressure will be caused to enter the passage 486 from the flexible hose 487 when the shift lever 490 is moved to the reverse position to actuate the reverse fluid pressure system of the transmission 476. Fluid under pressure in the passage 486 will cause the piston 485 to be raised from a neutral position (N) to a reverse lock position (RL) (FIG. 27). A reverse lock actuation rod 492 pivotally interconnects the piston 485 with a reverse lock hook 493. The reverse lock hook 493 is utilized in a manner equivalent to the reverse lock hook 394 illustrated in FIG. 16.

In operation, the intermediate casing 13 will be held in an adjustably releasable position by an adjustable release lock mechanism or detent as previously described when the transmission 476 is in neutral. When the transmission 476 is conditioned for reverse by the lever 490 which actuates the reverse drive fluid pressure system of the transmission 476 when the reverse drive pressure system is actuated, fluid will be transmitted through the flexible hose 487 into the passage 486 in the head casing 12, through the inlet passage 489 and the interconnecting passage 491, to cause the reverse lock piston 485 to raise. The lock piston 485 will then in turn raise the actuating rod 492 and thereby pivot the reverse lock hook 493 in the lock position, the intermediate casing 13 will be held against clockwise rotation about the head casing 12. Thus, the drive unit 10 can be driven in reverse by the transmission 476 without the propeller action causing a raise up of the intermediate casing 13.

While applicants have described the invention in connection with certain specific constructions and arrangements, it is to be understood that this is by way of illustration and not by way of limitation and the scope of our invention is defined solely by the appended claims which should be constructed as broadly as the prior art will permit.

We claim:

1. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings for providing a forward and reverse drive, said gear train having a drive shaft in said first casing adapted to be driven by the engine and a propeller shaft in said third casing adapted to drive a propeller, said gear train including a forward and a reverse gear in meshing engagement with a drive gear on said drive shaft and rotatably mounted on a horizontal axis perpendicular to said drive shaft to provide for pivotal movement of said second casing with respect to said first casing about an axis perpendicular to the axis of said drive shaft means for selectively shifting said gear train between forward and reverse, independently selectively operable means for pivotally positioning said second casing about said first casing for adjusting the depth of the propeller, means for maintaining said second casing in its selected position, and means for rotating said third casing relative to said second casing for steering the boat.

2. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being interconnected, a drive shaft rotatably mounted in said first casing and connected to be driven at one end by the engine and having a bevel gear secured to the other end, an intermediate shaft rotatably mounted in said second casing and having a first bevel gear secured to the upper end and a second bevel gear secured to the lower end thereof, a propeller shaft rotatably mounted in said third casing and adapted to drive a propeller and having a bevel gear secured thereto in driving engagement with said second bevel gear of said intermediate shaft, an idler shaft secured to said first casing coaxial with the pivot axis of said first and second casings, a pair of bevel gears rotatably mounted on said idler shaft and adapted to be rotated continuously in opposite directions by said drive shaft bevel gear, an intermediate bevel gear keyed to said idler shaft in driving engagement with said first bevel gear of said intermediate shaft, means for selectively locking either gear of said first pair of bevel gears to said idler shaft for alternately applying a reverse or forward drive torque to said intermediate shaft, selectively operable means for pivotally positioning said second casing about said first casing to adjust the depth of the propeller, and means for maintaining said second casing in its selected position.

3. A marine outboard drive unit for a boat having an inboard engine and comprising the combination of a series of three interconnected casings, a first casing being mounted on the boat, a second casing being pivotally conected to said first casing and adapted to pivot about an axis through said first casing, said second and a third of said casings being rotatably interconnected, a drive shaft rotatably mounted in said first casing and connected to be driven at one end by the engine and having a bevel gear secured to the other end, an intermediate shaft rotatably mounted in said second casing and having a first bevel gear secured to the upper end and a second bevel gear secured to the lower end thereof, a propeller shaft rotatably mounted in said third casing and adapted to drive a propeller and having a bevel gear secured thereto in driving engagement with said second bevel gear of said intermediate shaft, an idler shaft secured to said first casing coaxial with the pivot axis of said first and second casings, a pair of bevel gears rotatably mounted on said idler shaft and adapted to be rotated continuously in opposite directions by said drive shaft bevel gear, an intermediate bevel gear keyed to said idler shaft in driving engagement with said first bevel gear of said intermediate shaft, means for selectively locking either gear of said first pair of bevel gears to said idler shaft for alternately applying a reverse or forward drive torque to said intermediate shaft, selectively operable means for pivotally positioning said second casing about said first casing to adjust the depth of the propeller, means for maintaining said second casing in its selected position, and means for rotating said third casing relative to said second casing to steer the boat.

4. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a drive shaft rotatably mounted in said first casing connected to be driven at one end by the engine and having a bevel gear secured to the other end, an intermediate shaft rotatably mounted in said second casing and having a first bevel gear secured to the upper end and a second bevel gear secured to the lower end thereof, a propeller shaft rotatably mounted in said third casing and adapted to drive a propeller, and having a bevel gear secured thereto in driving engagement with said second gear of said intermediate shaft, an idler shaft secured to said first casing coaxial with the pivot axis of said first and second casings, a pair of bevel gears rotatably mounted on said idler shaft and adapted to be rotated continuously in opposite directions by said drive shaft bevel gear, an intermediate bevel gear keyed to said idler shaft in driving engagement with said first bevel gear of said intermediate shaft, means for selectively locking either gear of said first pair of bevel gears to said idler shaft for alternately applying a reverse or forward drive torque to said intermediate shaft, resilient linkage for applying an actuating force to said gear locking means to cause a shift directly between forward and reverse when the drive torque is below a predetermined minimum, selectively operable means for pivotally positioning said second casing about said first casing to adjust the depth of the propeller, means for maintaining said second casing in its selected position, and means for rotating said third casing relative to said second casing to steer the boat.

5. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a drive shaft rotatably mounted in said first casing and connected to be driven at one end by the engine and having a bevel gear secured to the other end, an intermediate shaft rotatably mounted in said second casing and having a first bevel gear secured to the upper end and a second bevel gear secured to the lower end thereof, a propeller shaft rotatably mounted in said third casing adapted to drive a propeller and having a bevel gear secured thereto in driving engagement with said second bevel gear of said intermediate shaft, an idler shaft secured to said first casing coaxially with the pivot axis of said first and second casings, a pair of bevel gears rotatably mounted on said idler shaft and adapted to be rotated continuously in opposite directions by said drive shaft bevel gear, an intermediate bevel gear keyed to said idler shaft in driving engagement with said first bevel gear of said intermediate shaft, a collar slidably splined to said idler shaft for positively engaging either of the pair of gears to provide a respective forward or reverse drive in said idler shaft, a guide shaft rigidly mounted in said first casing parallel to said idler shaft, a shift fork slidably mounted on said guide shaft adapted to move said collar on said idler shaft, a yoke slidably mounted on said guide shaft adjacent the ends of said shift fork and adapted to be manually moved on said guide shaft, resilient means interconnecting said yoke and said shift fork, selectively operable means for pivotally positioning said second casing about said first casing to adjust the depth of the propeller, means for maintaining said second casing in its selected position, and means for rotating said third casing relative to said second casing to steer the boat.

6. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a drive shaft rotatably mounted in said first casing and connected to be driven at one end by the engine, a bevel gear secured to the other end of said drive shaft, an intermediate shaft rotatably mounted in said second casing and having a first bevel gear rigidly secured to the upper end and a second bevel gear secured to the lower end thereof, a propeller shaft rotatably mounted in said third casing adapted to drive a propeller and having a bevel gear secured thereto in driving engagement with said second bevel gear of said intermediate shaft, an idler shaft secured to said first casing coaxially with the pivot axis of said first and second casings, a pair of bevel gears rotatably mounted on said idler shaft and adapted to be rotated continuously in opposite directions by said drive shaft bevel gear, an intermediate bevel gear keyed to said idler shaft in driving engagement with said first bevel gear of said intermediate shaft, a collar slidably splined to said idler shaft for positively engaging either of the pair of gears to provide a respective forward or reverse drive in said idler shaft, a shift lever rotatably mounted on said first casing and extending into said first casing, a spring retainer rotatably fixed to said lever extension, axial compression springs retained in the periphery of said spring retainer in annularly spaced relation, a hub rotatably mounted on said lever extension having lugs extending axially between said springs for receiving rotational forces applied to said spring by said lever, a shift link secured to said hub and adapted to move said collar into engaging position, selectively operable means for pivotally positioning said second casing about said first casing to adjust the depth of the propeller, means for maintaining said second casing in its selected position, and means for rotating said third casing relative to said second casing to steer the boat.

7. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, selectively operable means for pivotally positioning said second casing about said first casing for adjusting the depth of the propeller, a detent for releasably maintaining said second casing in its selected position to allow release of said second casing when said third casing strikes an obstacle, means for rotating said third casing relative to said second casing for steering the boat, and locking means responsive to said shifting means to positively hold said second casing in selected position when the gear train is in reverse.

8. A marine outboard drive unit for a boat having an inboard engine operably coupled with a transmission having a forward and reverse and comprising the combination of a series of three interconnected casings, a first casing being mounted on the transmission, a second casing being pivotally connected to said first casing and adapted to pivot about an axis through said first casing, said second and third of said casings being rotatably interconnected, a gear train mounted in said casings, said gear train having a drive shaft in said first casing adapted to be driven from the transmission and a propeller shaft in said third casing adapted to drive a propeller, means for releasably holding said second casing in a given position to allow release of said second casing when said third casing strikes an obstacle, and locking means responsive to the transmission for positively holding said second casing in a selected position when the transmission is in reverse.

9. A marine outboard drive unit for a boat having an inboard engine operably coupled with a transmission having a forward and reverse and comprising the combination of a series of three interconnected casings, a first casing being mounted on the transmission, a second casing being pivotally connected to said first casing and adapted to pivot about an axis through said first casing, said second and third of said casings being rotatably interconnected, a gear train mounted in said casings, said gear train having a drive shaft in said first casing adapted to be driven from the transmission and a propeller shaft in said third casing adapted to drive a propeller, selectively operable means for pivotally positioning said second casing about said first casing for adjusting the depth of the propeller, means for releasably maintaining said second casing in its selected position to allow release of said second casing when said third casing strikes an obstacle, locking means responsive to the transmission for positively holding said second casing in selected position when the transmission is in reverse, and means for rotating said third casing relative to said second casing for steering the boat.

10. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, selectively operable means for pivotally positioning said second casing about said first casing for adjusting the depth of the propeller, means for releasably holding said second casing in its selected position, means for rotating said third casing relative to said second casing for steering the boat, a hook pivotally secured to said first casing, and a hook receiving member rigidly secured to said second casing, said hook being biased about the pivot point thereof into engagement with said hook receiving member for positively holding said casing in selected position, said hook being actuated by said shifting means for disengaging said hook from said hook receiving member when said gear train is in forward condition.

11. A marine outboard drive unit for a boat having an inboard engine and comprising the combination of a series of three interconnected casings, a first casing being mounted on the boat, a second casing being pivotally connected to said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, selectively operable means for pivotally positioning said second casing about said first casing for adjusting the depth of the propeller, means for releasably holding said second casing in its selected position, means for rotating said third casing relative to said second casing for steering the boat, a single tooth hook pivotally secured to said first casing, and a hook receiving member rigidly secured to said second casing having a series of notches adapted to receive said hook tooth in any selected position of said second casing, said hook being biased about the pivot point thereof for forcing said hook tooth into one of the notches to positively hold said second casing in selected position, said hook being actuated by said shifting means for disengaging said hook from said hook receiving member when said gear train is in forward condition.

12. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, selectively operable means for pivotally positioning said second casing about said first casing for adjusting the depth of the propeller, means for releasably holding said second casing in its selected position, means for rotating said third casing relative to said second casing for steering the boat, a pin extending from said second casing, and a hook pivotally secured to said first casing and having a series of notches, the notches of said hook being individually appropriately adapted to receive said pin, said hook being biased about the pivot point thereof for forcing an appropriate notch thereof to receive said pin, said hook being actuated by said shifting means for disengaging said hook from said pin when said gear train is in forward condition.

13. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, selectively operable means for pivotally positioning said second casing about said first casing for adjusting the depth of the propeller, means for releasably holding said second casing in its selected position, means for rotating said third casing relative to said second casing for steering the boat, a hook pivotally secured to said first casing, a hook receiving member rigidly secured to said second casing, said hook being biased about the pivot point thereof into engagement with said hook receiving member for positively holding said casing in selected position, and resilient means interconnecting said hook and said shifting means for urging said hook from said hook receiving member when said shifting means is shifted to forward.

14. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse to urge the drive unit in a corresponding forward or reverse direction, selectively operable means for pivotally positioning said second casing about said first casing for adjusting the depth of the propeller, means for rotating said third casing relative to said second casing for steering the boat, a bracket rigidly secured to said first casing and extending adjacent to said second casing, said bracket having a series of symmetrical notches therein opening radially outward on a circular path coaxial with the pivot axis, a frame pivotally and slidably mounted on said bracket along a central radius of the circularly positioned notches, said frame having a rod which is adapted to laterally engage the notches, spring means for urging said frame along the central radius to urge said rod into one of the notches to position said second casing, cam means actuated by said pivotally positioning means for urging said frame rod outwardly in the notches against the force of said spring means when said pivotally positioning means is actuated to facilitate selection of position of said second casing, said second casing having a notch opening forwardly and adapted for receiving said frame rod to releasably retain said rod in the notches against a force applied rearwardly on said second casing and to positively retain said rod in the notches against a force applied forwardly on said casing, and means for locking said second casing in selected position.

15. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse to urge the drive unit in a corresponding forward or reverse direction, selectively operable means for pivotally positioning said second casing about said first casing for adjusting the depth of the propeller, means for rotating said third casing relative to said second casing for steering the boat, a bracket rigidly secured to said first casing and extending adjacent to said second casing, said second casing having a vertically extending lateral slot therethrough, a rod slidably positioned in said slot, resilient means for urging said rod downwardly in said slot, a stop adjustably secured to said bracket, said stop having a notch therein opening upwardly and rearwardly and adapted for receiving said rod to positively hold said rod against forward motion and to releasably hold said rod against rearward motion, and means for locking said second casing in selected position.

16. A marine outboard drive unit for a boat having an inboard engine and comprising the combination of a series of three interconnected casings, a first casing being mounted on the boat, a second casing being pivotally connected to said first casing and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse to urge the drive unit in a corresponding forward or reverse direction, means operable for positioning said second casing, means for rotating said third casing relative to said second casing for steering the boat, a bracket rigidly secured to said first casing and extending adjacent to said second casing, said bracket having a pair of holes therein adjacent opposite sides of said second casing, said second casing having a lateral passage therethrough, a pair of pins slidably mounted for limited movement in said passage and adapted to enter the holes, a resilient means positioned in said passage for urging said pins outwardly into the holes to releasably retain said second casing against pivotal movement about said first casing, a stop rigidly secured to said bracket for positively limiting forward movement of said second casing, and means for locking said second casing in position.

17. A marine outboard drive unit for a boat having an inboard engine and comprising the combination of a series of three interconnected casings, a first casing being mounted on the boat, a second casing being pivotally connected to said first casing, and adapted to pivot about an axis through said first casing, said second and a third of said casings being rotatably interconnected, a gear train mounted in said casings having a forward and reverse drive, said gear train having a drive shaft in said first casing adapted to be driven by the engine and a propeller shaft in said third casing adapted to drive a propeller, means for selectively shifting said gear train from forward to reverse, means for releasably holding said second casing to prevent rotation of said second casing about said first casing, a circular ratchet secured to said first casing, a lever mounted on said ratchet and adapted to pivot about the axis of said ratchet, a pawl pivotally secured to said lever for engaging said ratchet to restrain pivotal movement of said lever in one direction, a stop affixed to said second casing, cam pivotally secured to said second casing for movement in a limited arc depending on the position of said stop to release said releasable holding means, a cable connecting said lever and said cam adapted to transmit pivotal movement of said lever to said cam for urging said cam about the pivot point thereof to rotate the cam toward said stop and to pivot said second casing about said first casing, means for rotating said third casing relative to said second casing for steering the boat, and means for positively holding said second casing in selected position when said gear train is in reverse condition.

References Cited in the file of this patent
UNITED STATES PATENTS

| | | |
|---|---|---|
| 1,943,288 | Chander et al. | Jan. 16, 1934 |
| 1,943,323 | Johnson | Jan. 16, 1934 |
| 2,284,589 | Rippingille | May 26, 1942 |
| 2,536,894 | Wanzer | Jan. 2, 1951 |
| 2,681,029 | Canazzi | June 15, 1954 |
| 2,682,853 | Petersen | July 6, 1954 |
| 2,752,875 | Hills | July 3, 1956 |
| 2,837,051 | Friedrich | June 3, 1958 |
| 2,908,243 | Erickson | Oct. 13, 1959 |
| 2,911,938 | Hulsebus | Nov. 10, 1959 |
| 2,946,306 | Leipert | July 26, 1960 |
| 3,051,120 | Stendal | Aug. 28, 1962 |
| 3,083,678 | Leipert | Apr. 2, 1963 |